United States Patent
Noh et al.

(12)

(10) Patent No.: US 9,851,720 B2
(45) Date of Patent: *Dec. 26, 2017

(54) METHOD OF CONTROLLING A CLEANER

(71) Applicant: LG ELECTRONICS INC., Seoul (KR)

(72) Inventors: Dongki Noh, Seoul (KR); Seungmin Baek, Seoul (KR); Hyungrock Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

This patent is subject to a terminal disclaimer.

(21) Appl. No.: 14/712,297

(22) Filed: May 14, 2015

(65) Prior Publication Data

US 2015/0331424 A1   Nov. 19, 2015

(30) Foreign Application Priority Data

May 15, 2014   (KR) .................. 10-2014-0058563

(51) Int. Cl.
*G05D 1/02* (2006.01)
*A47L 9/00* (2006.01)
*A47L 9/28* (2006.01)

(52) U.S. Cl.
CPC ............ *G05D 1/0231* (2013.01); *A47L 9/009* (2013.01); *A47L 9/2852* (2013.01);
(Continued)

(58) Field of Classification Search
CPC .. G05D 1/0231; G05D 1/0248; G05D 1/0234; G05D 1/0246; G05D 2201/0215; A47L 9/009; A47L 9/2852

USPC .......................................................... 701/28
See application file for complete search history.

(56) References Cited

U.S. PATENT DOCUMENTS 6,459,955 B1 * 10/2002 Bartsch .................... A47L 9/00
                                                                        318/568.11
2002/0138936 A1   10/2002 Takeuchi et al.
(Continued)

FOREIGN PATENT DOCUMENTS

CN        101420896 A     4/2009
EP        2 420 171 A1    2/2012
(Continued)

OTHER PUBLICATIONS

WO 2007/051972 A1, WIPO, Navigation System, May 10, 2007, pp. 1-34.*

(Continued)

*Primary Examiner* — Jerrah Edwards
*Assistant Examiner* — Majdi Alsomiri
(74) *Attorney, Agent, or Firm* — Dentons US LLP

(57) ABSTRACT

Disclosed herein is a method of controlling a cleaner including a movable body for suctioning and a following body for collecting the dust suctioned by the movable body, the method including: (a) acquiring an image for a view around the following body; (b) acquiring position information of the movable body in an real space, based on the image; (c) acquiring position information of an obstacle in the real space, based on the image; (d) setting a travel direction such that the following body avoids the obstacle to follow the movable body, based on the position information of the movable body and the position information of the obstacle; and (e) controlling the following body to travel in the set travel direction.

15 Claims, 16 Drawing Sheets

(52) U.S. Cl.
CPC ......... *G05D 1/0234* (2013.01); *G05D 1/0246* (2013.01); *G05D 1/0248* (2013.01); *G05D 2201/0215* (2013.01)

(56) References Cited

U.S. PATENT DOCUMENTS

| | | | | |
|---|---|---|---|---|
| 2008/0015738 | A1* | 1/2008 | Casey | G05D 1/0238 700/258 |
| 2013/0338831 | A1* | 12/2013 | Noh | B25J 9/1676 700/259 |
| 2014/0343783 | A1* | 11/2014 | Lee | A47L 9/2894 701/25 |

FOREIGN PATENT DOCUMENTS

| | | |
|---|---|---|
| EP | 2420170 B1 | 4/2013 |
| EP | 2 630 903 A2 | 8/2013 |
| EP | 2 939 580 A1 | 11/2015 |
| JP | 2007199965 A | 8/2007 |
| KR | 10-2012-0017164 A | 2/2012 |
| KR | 1020120017847 A | 2/2012 |
| KR | 101318071 B1 | 10/2013 |
| WO | 2007/051972 A1 | 5/2007 |

OTHER PUBLICATIONS

Anonymous: Mobile Robots Navigation, Mapping, and Localization Part I (Artificial Intelligence), Feb. 27, 2013, XP055274512, pp. 1-8.

\* cited by examiner

ACTIVE FOLLOWING (a)　　　　(b)　　　　　(c)

(a)                    (b)

(a)  (b)

METHOD OF CONTROLLING A CLEANER

CROSS-REFERENCE TO RELATED APPLICATION

This application claims the priority benefit of Korean Patent Application No. 10-2014-0058563, filed on May 15, 2014 in the Korean Intellectual Property Office, the disclosure of which is incorporated herein by reference.

BACKGROUND

1. Field

The present invention relates to a cleaner and a method of controlling the same.

2. Background

A cleaner is an apparatus that suctions dust from floor. In general, the cleaner includes a suction device having a suction port for air suction and a main body connected to the suction device via a hose defining an air suction channel. The main body is provided with an air suction fan for generating negative pressure to suction air through the suction port, and the suction device or the main body is provided with a dust collector for collecting dust introduced through the hose.

The suction device is moved by a user, and the main body follows the suction device. Generally, the main body is moved by tension applied from the hose. In recent years, there has been developed a cleaner including a motor mounted in the main body for rotating wheels of the main body such that the main body can move for itself.

In addition, there is known a cleaner including an ultrasonic transmitter provided at the suction device and an ultrasonic receiver provided at the main body such that the main body actively follows the suction device based on ultrasonic waves received through the ultrasonic receiver. However, if obstacles are present between the main body and the suction device, the conventional cleaners are inconvenient in that a user removes the obstacles his/herself such that the main body does not collide with the obstacles during travel.

Moreover, since the ultrasonic receiver also receives ultrasonic waves reflected from obstacles or walls in a cleaning region, the main body may not properly follow the suction device and thus interference may occur between a movement line of the user and movement route of the main body, thereby causing customer dissatisfaction.

SUMMARY OF THE INVENTION

Therefore, the present invention has been made in view of the above problems, and it is an object of the present invention to provide a cleaner including a movable body (or suction device) and a following body (or main body) capable of avoiding obstacles in a cleaning region when it follows the movable body, and a method of controlling the cleaner.

In addition, it is another object of the present invention to provide a cleaner and a method of controlling the same, in which a following body has improved following capability compared to a conventional method of using ultrasonic waves.

In addition, it is a further object of the present invention to provide a cleaner traveling along an optimal path in which a following body is capable of following a movable body while avoiding obstacles, and a method of controlling the same.

In accordance with an aspect of the present invention, the above and other objects can be accomplished by the provision of a method of controlling a cleaner a movable body for suctioning and a following body for collecting the dust suctioned by the movable body, the method including (a) acquiring an image for a view around the following body, (b) acquiring position information of the movable body in an real space, based on the image, (c) acquiring position information of an obstacle in the real space, based on the image, (d) setting a travel direction such that the following body avoids the obstacle to follow the movable body, based on the position information of the movable body and the position information of the obstacle, and (e) controlling the following body to travel in the set travel direction.

In accordance with another aspect of the present invention, there is provided a cleaner including a movable body for suctioning, a following body configured to follow the movable body, the following body collecting the dust suctioned by the movable body, a travel unit for allowing the following body to travel, an image acquisition unit acquiring an image for a view around the following body, and a controller acquiring position information of the movable body in an real space, based on the image, acquiring position information of an obstacle in the real space, setting a travel direction such that the following body avoids the obstacle to follow the movable body, based on the position information of the movable body and the position information of the obstacle, and controlling the travel unit such that the following body travels in the set travel direction.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Advantages, features and methods for achieving those of embodiments may become apparent upon referring to embodiments described later in detail together with attached drawings. However, embodiments are not limited to the embodiments disclosed hereinafter, but may be embodied in different modes. The embodiments are provided for perfection of disclosure and informing a scope to persons skilled in this field of art. The same reference numbers may refer to the same elements throughout the specification.

Figure 1:
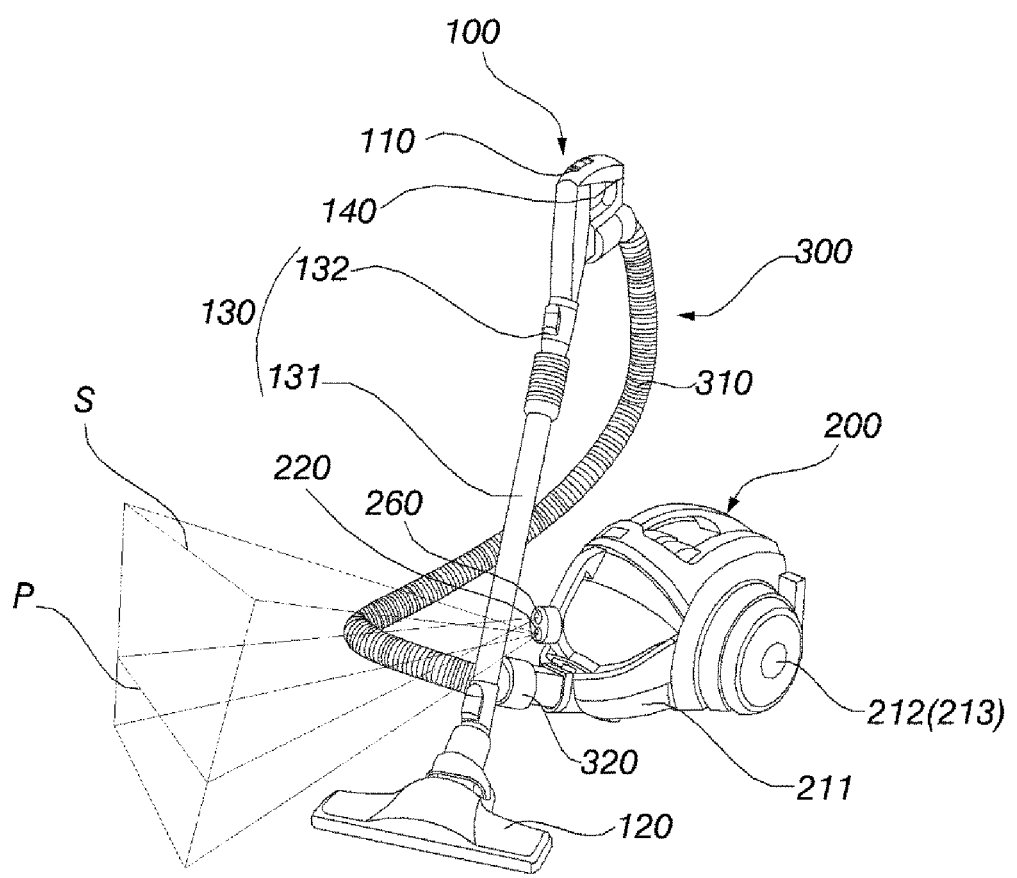
FIG. 1 is a view illustrating a cleaner according to an embodiment of the present invention.
Figure 2:
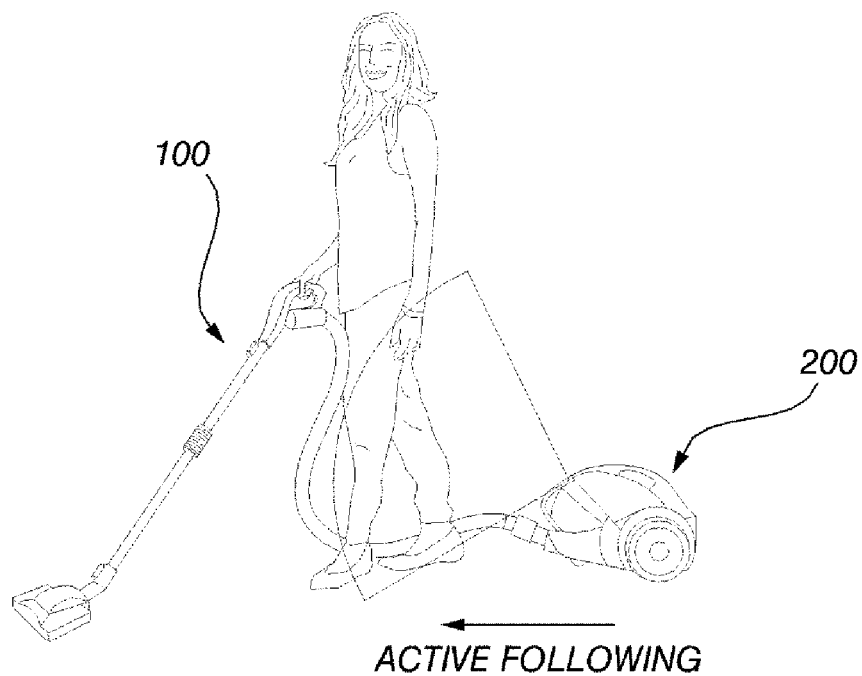
FIG. 2 is a view illustrating that a main body follows a suction device.
Figure 3:
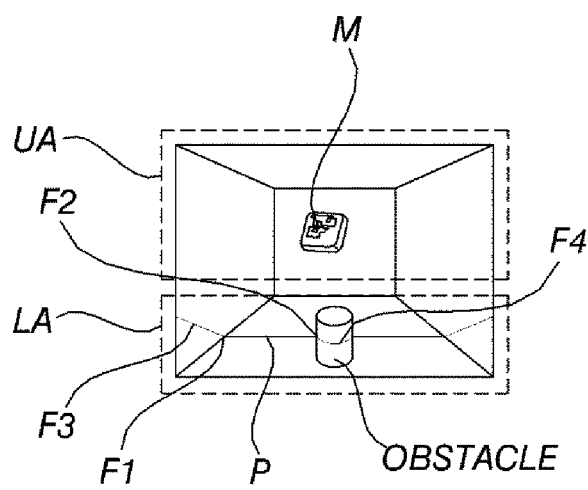
FIG. 3 is a view illustrating one image captured by the cleaner according to the embodiment of the present invention.
Figure 4:
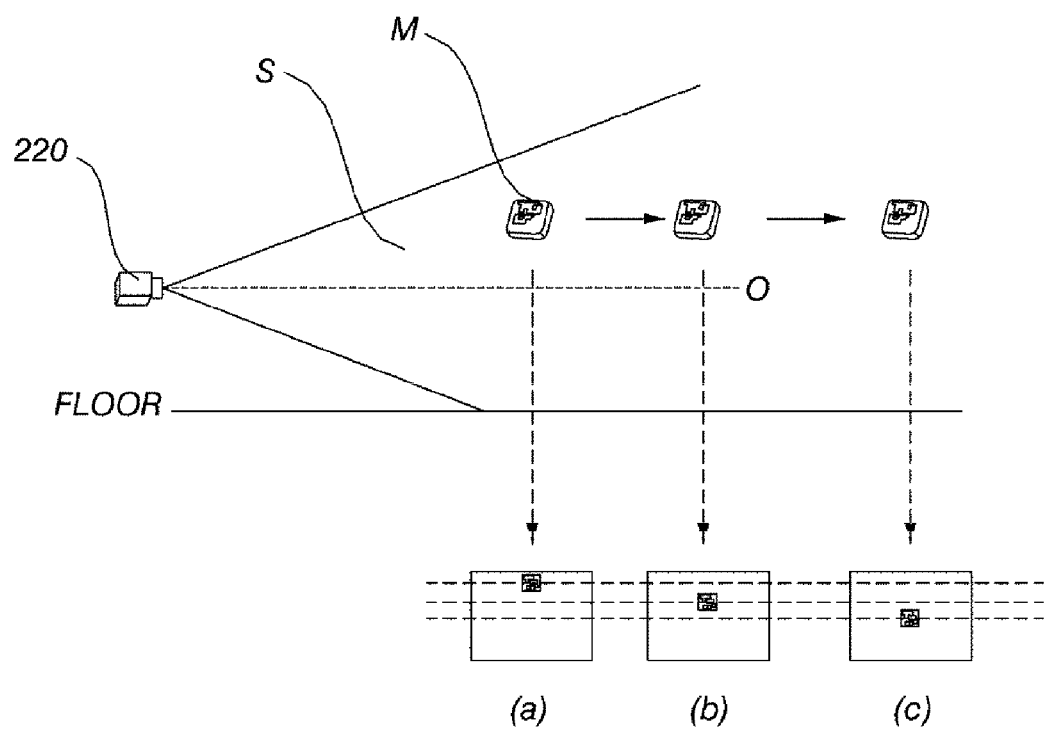
FIG. 4 is a view for schematically explaining a change in position of a marker on an image, according to a change in distance of the marker from the main body.
Figure 5:
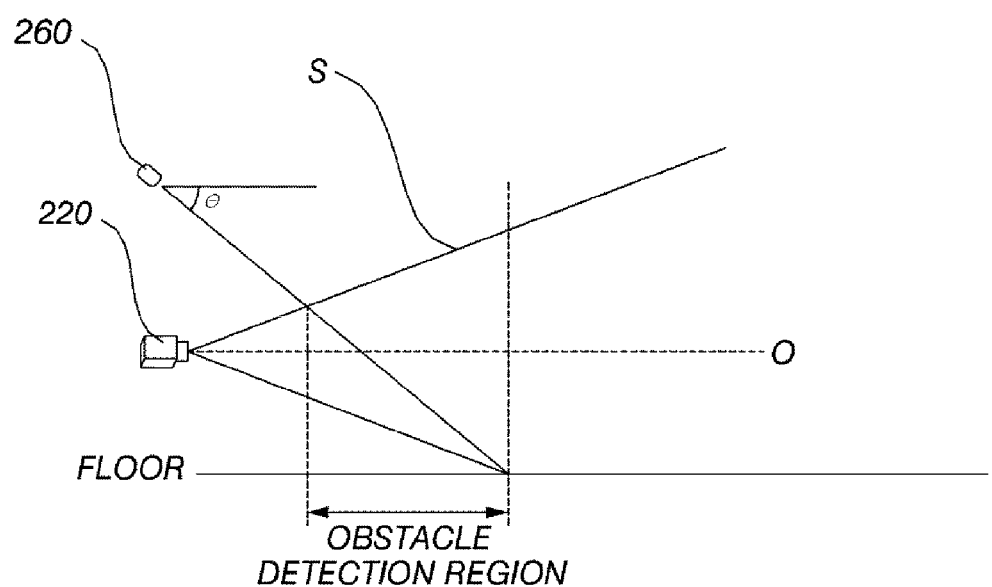
FIG. 5 is a view schematically illustrating an irradiation range of a pattern light irradiation unit.
Figure 6:
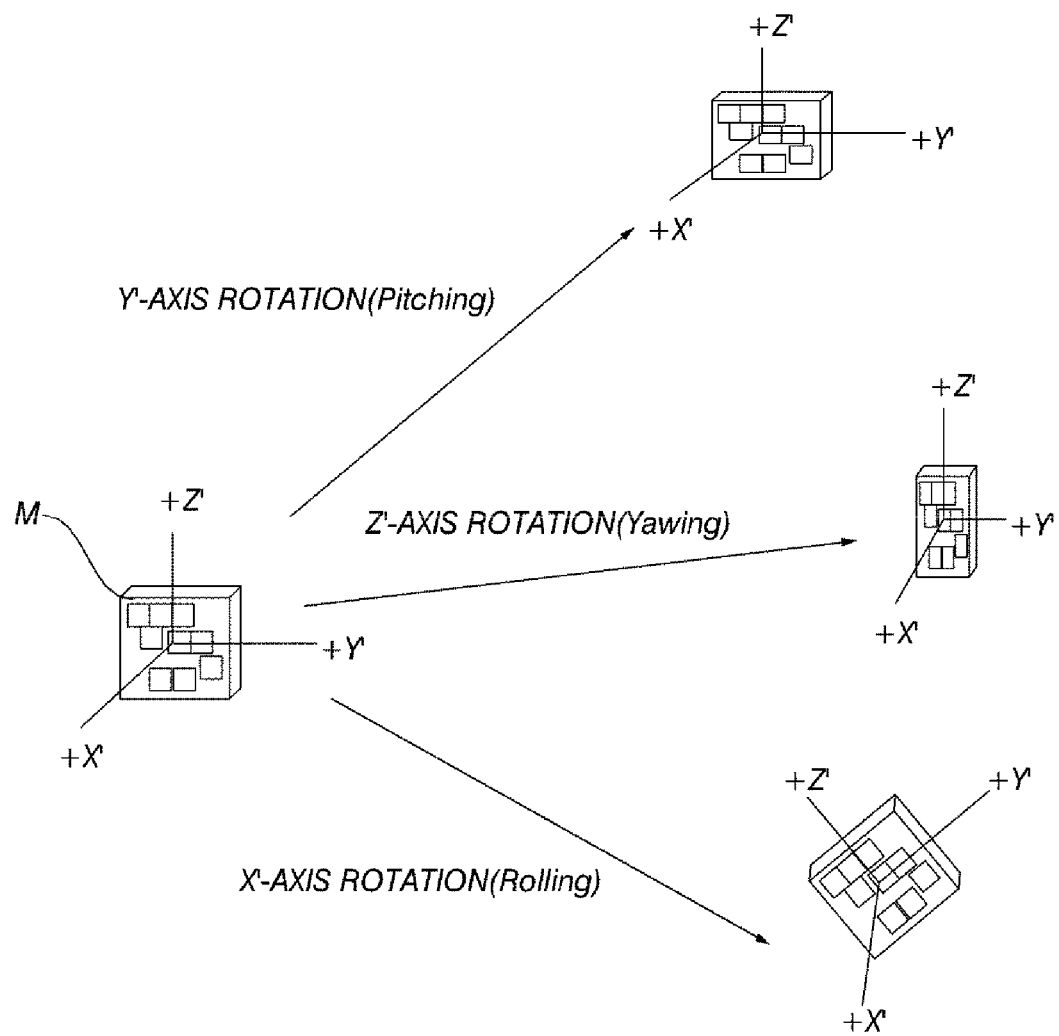
FIG. 6 is a view illustrating a change in shape of a marker on an image, according to a change in posture of the marker in an real space.
Figure 7:
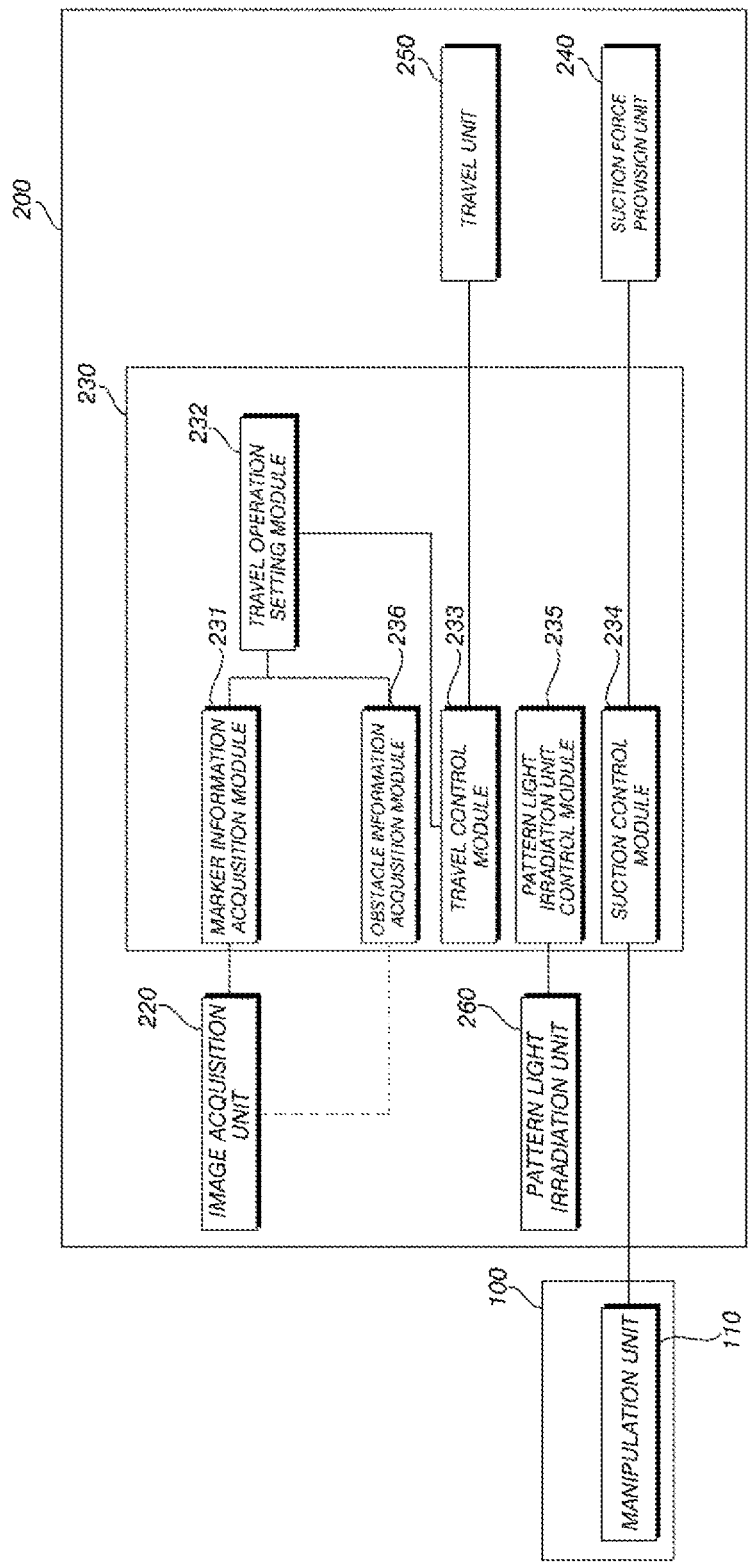
FIG. 7 is a block diagram illustrating a configuration of main components of the cleaner according to the embodiment of the present invention.

FIG. 1 is a view illustrating a cleaner according to an embodiment of the present invention. FIG. 2 is a view illustrating that a main body follows a suction device. FIG. 3 is a view illustrating one image captured by the cleaner according to the embodiment of the present invention. FIG. 4 is a view for schematically explaining a change in position of a marker on an image, according to a change in distance of the marker from the main body. FIG. 5 is a view schematically illustrating an irradiation range of a pattern light irradiation unit. FIG. 6 is a view illustrating a change in shape of a marker on an image, according to a change in posture of the marker in an real space. FIG. 7 is a block diagram illustrating a configuration of main components of the cleaner according to the embodiment of the present invention.

A cleaner according to an embodiment of the present invention includes a movable body configured to be movable for suctioning dust and a following body for collecting the dust suctioned by the movable body, the following body being mobile. The following body includes an image acquisition unit 220 for acquiring an image for a view around the following body and a controller 230 for controlling the following body to travel while following the movable body based on the acquired image. Referring to FIG. 1, the movable body may be a suction device 100, and the following body may be a main body 200. Hereinafter, by way of example, the movable body will be described as the suction device 100, and the following body will be described as the main body 200.

Referring to FIG. 1, a cleaner according to an embodiment of the present invention may include a suction device 100 and a main body 200. The suction device 100 is connected to the main body 200 via a hose 300. Air suctioned by the suction device 100 is introduced into the main body 200 via the hose 300. The main body 200 may be provided with a dust collector (not shown) for collecting dust from the air introduced into the main body 200 via the hose 300. The suction device 100 may be provided with a suction port (not shown), through external air is suctioned into the suction device 100. The main body 200 may provide suction force via the hose 300 such that the external air can be suctioned into the suction device 100 through the suction port. The suction device 100 is moved along a floor according to manipulation of a user.

The suction device 100 may include a suction unit 120 configured such that the suction port, through which dust is suctioned into the suction device 100, faces a floor of a cleaning zone, an intake pipe 130 extending from the suction unit 120 for defining a channel along which the dust suctioned through the suction port moves, and a handle 140 provided at the upper part of the intake pipe 130. A user may push or pull the suction device 100 while holding the handle 140 to move the suction device 100.

The intake pipe 130 forms a channel along which air suctioned through the suction unit 120 moves. The intake pipe 130 may include a lower pipe 131 connected to the suction unit 120 and an upper pipe 132 slidably connected to the lower pipe 131. As the upper pipe 132 slides along the lower pipe 131, the overall length of the intake pipe 130 may be varied. The handle 140 is configured to be located higher than the waist of the user during cleaning. In this embodiment, the handle 140 is provided at the upper pipe 132.

Air is introduced through one end of the hose 300 connected to the intake pipe 130 and is discharged through the other end of the hose 300 connected to the main body 200. The hose 300 may include a flexible portion 310. The flexible portion 310 may be bent according to movement of the suction device 100. The position of the suction device 100 relative to the main body 200 may be varied according to manipulation of the user. Since the suction device 100 is moved within a length of the hose 300, however, the suction device 100 cannot be distant more than a predetermined distance from the main body 200.

The hose 300 includes a main body connection unit 320 connected to the main body 200. The main body connection unit 320 may be rigid body. The main body connection unit 320 is moved along with the main body 200. The main body connection unit 320 may be separably coupled to the main body 200.

The main body 200 may include a case 211 forming the external appearance of the main body 200 and at least one wheel rotatably mounted at the case 211. The main body 200 may move straight and turn using the wheel. In this embodiment, a left wheel 212 and a right wheel 213 are provided at left and right sides of the case 211, respectively. The main body 200 may turn based on a difference in rotational speed between the left wheel 212 and the right wheel 213.

Referring to FIG. 7, the cleaner may include a travel unit 250 for allowing the main body 200 to travel. The travel unit 250 may be provided in the main body 200. The travel unit 250 may include at least one motor for rotating the left and right wheels 212 and 213. In the embodiment, the cleaner may also include a pair of motors for respectively driving the left and right wheels 212 and 213, and alternatively may include one motor and a power transfer means for transferring driving force from the motor to the left and right wheels 212 and 213. In the former case, the main body 200 may turn based on a difference in rotational speed between the motors. In the latter case, the main body 200 may turn based on a difference in rotational speed between the left wheel 212 and the right wheel 213 based on the power transmission means.

The main body 200 may further include a suction force provision unit 240. The suction force provision unit 240 forms negative pressure for the suction device 100 to suction external air. The suction force provision unit 240 may include a fan motor (not shown) and a fan (not shown) rotated by the fan motor. The fan motor may be driven under control of a suction control module 234 of a controller 230. The suction force provision unit 240 may be provided in the case 211. In addition, the dust collector (not shown) for collecting dust suctioned through the hose 300 may be disposed in the case 211.

The suction device 100 may further include a manipulation unit 110. The manipulation unit 110 allows the user to input various control commands. In particular, it is possible to control the operation of the suction force provision unit 240 through the manipulation unit 110. The position of the manipulation unit 110 is set such that the manipulation unit 110 can be manipulated by the thumb of the user holding the handle 140. In this embodiment, the manipulation unit 110 is provided at the handle 140. However, the present invention is not limited thereto. The suction control module 234 may control the operation of the suction force provision unit 240 according to a control command input through the manipulation unit 110.

The image acquisition unit 220 acquires an image for a view around the main body 200. For example, the image acquisition unit 220 may acquire an image for a view ahead of the main body 200 (or in a travel direction of the main body 200). The image acquisition unit 220 may include a camera. For example, the image acquisition unit 220 may include a digital camera that is capable of acquiring a digital image. The digital camera may be configured such that an optical axis O (see FIG. 4) of a lens of the digital camera faces ahead of the main body 200. (see FIGS. 4 and 5).

The controller 230 controls the main body 200 to travel while following the suction device 100 based on the image acquired by the image acquisition unit 220. The controller 230 may include a marker information acquisition module 231, a travel operation setting module 232, a travel control module 233, and/or a suction control module 234. These modules will hereinafter be described in more detail.

Meanwhile, the movement of the main body 200 may be classified as a passive movement of the main body 200 in which the main body 200 is moved by tension from the user or an active movement of the main body 200 in which the wheels 212 and 213 of the main body 200 are rotated by the motor. The term "following" or "active following" used in the following description is based on the active movement of the main body 200.

The travel unit 250 may include a clutch for transmitting drive force from the motor to the wheels 212 and 213. Drive force from the motor may be transmitted to the wheels 212 and 213 according to the operation of the clutch with the result that the active movement of the main body 200 may be achieved. On the other hand, the passive movement of the main body 200 may be achieved in a state in which the transmission of the drive force from the motor to the wheels 212 and 213 is released.

Referring to FIGS. 3 to 6, the cleaner according to the embodiment of the present invention may include a marker M displaced according to the movement of the suction device 100. The controller 230 may control the travel operation of the main body 200 based on the position (or posture) of the marker M indicated in the image acquired by the image acquisition unit 220. The image acquisition unit 220 may repeatedly acquire images during travel of the main body 200. In this case, controller 230 may control the travel operation of the main body 200 based on the acquired images even during travel of the main body 200. Even when the position or the posture of the marker M is changed during travel of the main body 200, therefore, the controller 230 may sense the change in position or posture of the marker M based on the images and reset the travel operation of the main body 200 based on the sensed change in position or posture of the marker M. As a result, the main body 200 is moved based on the reset travel operation of the main body 200. Consequently, it is possible for the main body 200 to follow the marker M.

Referring to FIGS. 3 to 6, when the user cleans the floor while moving the suction device 100, the marker M is also moved according to the movement of the suction device 100. As a result, the position (see FIG. 4) or the posture (see FIG. 6) of the marker M in the image acquired by the image acquisition unit 220 (hereinafter, referred to as the acquired image) is also varied.

More specifically, the position of the marker M indicated in the acquired image reflects position information of the marker M in a real space. The position information may include information regarding a distance from the main body 200 to the marker M or information regarding a direction in which the marker M is positioned relative to the main body 200. The marker information acquisition module 231 may acquire the position information of the marker M in the real space based on the position of the marker M indicated in the image acquired by the image acquisition unit 220.

Since the image acquisition unit 220 has a fixed visual field, and the height from the floor to the marker M in the real space is not substantially too much changed, the position in the vertical direction of the marker M indicated in the acquired image reflects a distance between the main body 200 and the marker M in the real space. For example, as the position of the marker M in the image at a region above the optical axis O is moved more downward, the marker M is more distant from the main body 200 in the real space. Distances from the main body 200 to points in the real space corresponding to coordinates in the image may be prestored as a database, and the marker information acquisition module 231 may acquire information regarding the distance to the marker M based on the database.

In addition, the position in the horizontal direction of the marker M in the image reflects a direction in which the marker M is positioned relative to the main body 200 in the real space. For example, in a case in which the marker M is positioned in the image at the left side on the basis of a vertical line passing through the optical axis O, the marker M is positioned at the left side of the main body 200 in the real space. On the other hand, in a case in which the marker M is positioned in the image at the right side, the marker M is positioned at the right side of the main body 200 in the real space. Direction from the main body 200 to points in the real space corresponding to coordinates in the image may be prestored as a database, and the marker information acquisition module 231 may acquire information regarding the direction in which the marker M is positioned relative to the main body 200 based on the database.

The main body 200 may further include a pattern light irradiation unit 260. The pattern light irradiation unit 260 may include a light source and an optical pattern projection element (OPPE). Light emitted from the light source is transmitted through the optical pattern projection element with the result that a uniform pattern light (hereinafter, referred to as "pattern light") is generated. The light source may be a laser diode (LD) or a light emitting diode (LED). Laser light exhibits monochromaticity, straightness, and connection characteristics superior to other light sources, and therefore accurate distance measurement is possible.

However, infrared light or visible light has a problem in that distance measurement accuracy has a great deviation depending upon a factor, such as color or material, of an object. For these reasons, the laser diode (LD) may be used as the light source. The optical pattern projection element may include a mask or a diffractive optical element (DOE). A pattern generated by the optical pattern projection element may include at least one pattern component, such as a point, a line, or a plane.

A pattern light irradiation unit control module 235 controls the pattern light irradiation unit 260. The pattern light irradiation unit control module 235 may control the pattern light irradiation unit 260 to irradiate pattern light not only before the travel of the main body 200 is commenced but also during travel of the main body 200.

Figure 18:
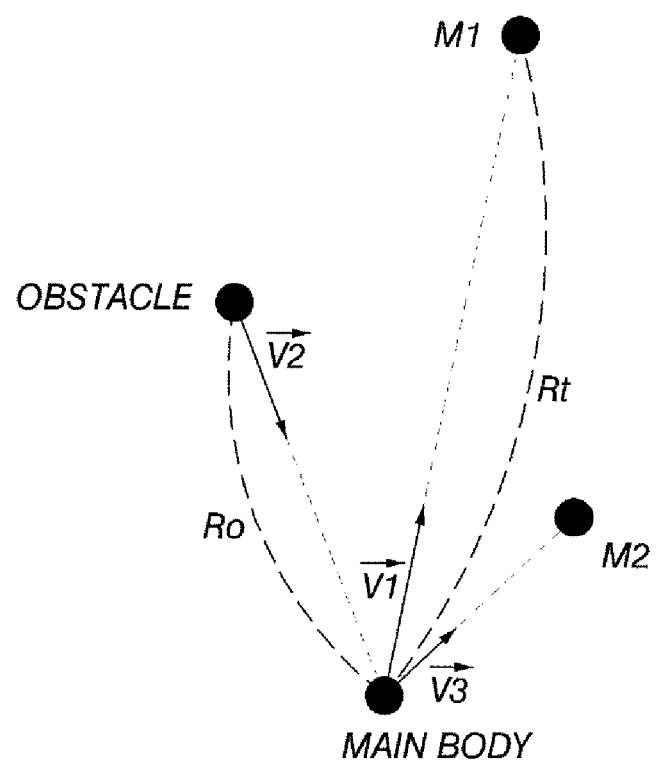
FIG. 18 is a view for explaining elements considered when a travel direction of a main body is set in step S30 of FIG. 17.

Referring to FIG. 5, the pattern light irradiation unit 260 may irradiate a predetermined pattern light ahead of the main body 200. In particular, the pattern light is irradiated slightly downward such that the pattern light is irradiated to the floor of the cleaning zone. In order to form a view angle necessary to detect the distance to an obstacle, an irradiation direction of the pattern light and the optical axis O of the image acquisition unit 220 may not be parallel to each other but form a predetermined angle θ. An obstacle detection region of FIG. 18 is a region at which it is possible to detect an obstacle based on the irradiated pattern light. The possible maximum distance for obstacle detection may be shorter than the length of the hose 300. In addition, the maximum distance for obstacle detection may not reach a position at which the user normally stands.

Referring to FIG. 3, the obstacle information acquisition module 236 may sequentially compare brightness of points in the acquired image in a horizontal direction to extract a pattern P constituted by points a predetermined level brighter than the surroundings. A lower area LA of the acquired image is an area to which the pattern light is irradiated. The obstacle information acquisition module 236 extracts the pattern P from the lower area LA and acquires information regarding an obstacle in the cleaning zone based on the extracted pattern P. The obstacle information may include information regarding the position of the obstacle, the distance from the main body 200 to the obstacle, the width or height of the obstacle, etc. The lower area LA may be below the optical axis O of the image acquisition unit 220. On the other hand, an upper area UA of the acquired image is an area from which the marker M is extracted. The upper area UA may be above the optical axis O of the image acquisition unit 220.

The controller 230, specifically the obstacle information acquisition module 236, acquires the obstacle information in the real space based on the change in geometry of the pattern (for example, the change in shape of the pattern or the change in position between the pattern components) in the acquired image. In this embodiment, the pattern light irradiation unit 260 irradiates pattern light having a horizontal segment P. The shape of the horizontal segment P may be deformed depending upon a situation of the cleaning zone to which the pattern light is irradiated or a situation of the obstacle. As can be seen from the acquired image shown in FIG. 17, the deformed segment P has a point F1 at which the segment is bent, the point F1 corresponding to an interface between a wall and the floor, a slant line F3 extending along the wall, and a portion F4 of the segment deformed depending upon the shape of the surface of the obstacle. The obstacle information acquisition module 236 may acquire obstacle information based on the various characteristics of the pattern extracted from the acquired image.

A direction in which the pattern light is irradiated by the pattern light irradiation unit 260 is fixed. When the pattern light is irradiated to a region having no obstacle, therefore, the position of a pattern in an acquired image is always uniform. Hereinafter, the acquired image at this time will be referred to as a reference acquired image. Position information of the pattern in the reference acquired image may be pre-calculated using triangulation. On the assumption that coordinates of any pattern component Q constituting the pattern in the reference acquired image are Q(Yi, Zi), a distance value Li(Q) from the main body 200 to the pattern component Q may be pre-calculated using triangulation. Coordinates Q'(Yi', Zi') of the pattern component Q in the acquired image obtained by irradiating a pattern light into a region having an obstacle result from the movement of Q(Yi, Zi) of the pattern component Q in the reference acquired image. The obstacle information acquisition module 236 may compare the coordinates Q'(Yi', Zi') of the pattern component Q with the coordinates Q(Yi, Zi) of the pattern component Q to acquire obstacle information regarding the width and the height of the obstacle and the distance to the obstacle. In particular, it is possible to recognize the width or the shape of the obstacle or the distance to the obstacle based on a view angle or a degree in which the horizontal line constituting the pattern is bent. In addition, it is possible to recognize the height of the obstacle based on the vertical displacement of the horizontal line or the length of the vertical line.

The travel operation setting module 232 may set a travel operation or a travel route of the main body 200 in which the main body 200 can follow the marker M while avoiding the obstacle based on the marker information, such as the position, the movement, and the change in posture, of the marker acquired by the marker information acquisition module 231 and the obstacle information acquired by the obstacle information acquisition module 236.

The travel control module 233 controls travel unit 250 such that the main body 200 travels in the travel direction set by the travel operation setting module 232. Thus, the main body 200 may follow the suction device 100 while not striking the obstacle.

The travel control module 233 may control the travel of the main body 200 according to the travel direction set by the travel operation setting module 232. As the travel unit 250 is controlled by the travel control module 233, the main body 200 follows the suction device 100 while moving according to the set travel direction. The movement of the main body 200 is not necessarily achieved until the main body 200 reaches the suction device 100. Since the user is generally located between the main body 200 and the suction device 100, it is sufficient for the main body 200 to move to a position spaced apart from the suction device 100 by a predetermined distance. For example, in a case in which the length of the hose 300 is 1 m, the main body 200 may move to a position spaced apart from the suction device 100 by about 40 to 60 cm and then be stopped. The distance between the main body 200 and the suction device 100 may be measured on the floor. The distance between the main body 200 and the suction device 100 may be calculated based on the position of the marker M indicated in the image.

Referring to FIG. 4, the change in position of the marker M indicated in the acquired image reflects the movement of the marker M in the real space. For example, as shown in FIG. 4, as the marker M is more distant from the main body 200 in the real space, the position of the marker M in the image at the region above the optical axis O is moved more downward. Information regarding the movement of the marker M in the real space may be acquired based on the change in position of the marker M indicated in the image. Of course, the movement information may include the change in direction in which the marker M is moved as well as the change in distance from the main body 200 to the marker M.

As the marker M is more distant from the main body 200 within a visual field S of the image acquisition unit 220, the position of the marker M in the acquired image is moved more downward. In this case, however, the marker M is positioned above the optical axis O of the image acquisition unit 220. On the other hand, in a case in which the marker M is positioned below the optical axis O of the image acquisition unit 220 (for example, the marker M is moved along the floor), as the marker M is more distant from the main body 200, the position of the marker M in the acquired image is moved more upward.

The marker information acquisition module 231 may extract the marker M from the acquired image to acquire movement information of the marker M. The travel operation setting module 232 may set a travelling direction and/or travel route along which the main body 200 approaches the marker M based on the movement information of the marker M.

In the same manner as in the case in which the travel of the main body 200 is controlled based on the position of the marker M indicated in the image as described above, the travel operation setting module 232 may set the travel operation of the main body 200 based on the movement information of the marker M, and the travel control module 233 controls the travel unit 250 according to the set travel direction or along the set travel route, so that the main body 200 may follow the suction device 100.

Referring to FIG. 6, the shape of the marker M in the acquired image is changed based on the posture of the marker M in the real space. At this time, the posture of the marker M is changed based on movement patterns of the marker M or a portion at which the marker M is disposed. The movement patterns may include a pitching pattern, a yawing pattern, and a rolling pattern. In a case in which the marker M is properly configured, it is possible to estimate a movement pattern of the marker M or the portion at which the marker M is disposed based on the change in shape of the marker M indicated in the acquired image.

For example, it is assumed that a three-dimensional X'Y'Z' moving Cartesian coordinate system (based on a right hand) is defined on the basis of the marker M, and the marker M is viewed in an –X' direction as shown in FIG. 6. In this case, pitching is a Y'-axis rotation. As shown, the length of the marker M in a Z' direction seems to be changed according to the pitching. Yawing is a Z'-axis rotation. As shown, the length of the marker M in a Y' direction seems to be changed. Rolling is an X'-axis rotation. As shown, the marker M seems to be rotated.

The marker information acquisition module 231 may further acquire information regarding the change in posture of the marker M in the real space based on the change in shape of the marker M indicated in the acquired image. In this case, the travel operation setting module 232 may set the travel operation of the main body 200 based on the posture change information of the marker M, and the travel control module 233 may control the travel unit 250 to travel the main body 200 according to the set travel operation of the main body 200. The posture change information will be described in more detail later with reference to FIGS. 12 and 13.

Figure 8:
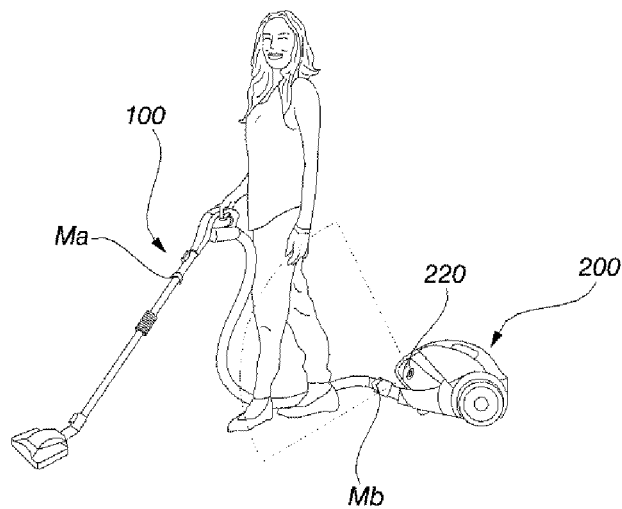
FIG. 8 is a view illustrating an example of positions of markers.
Figure 9:
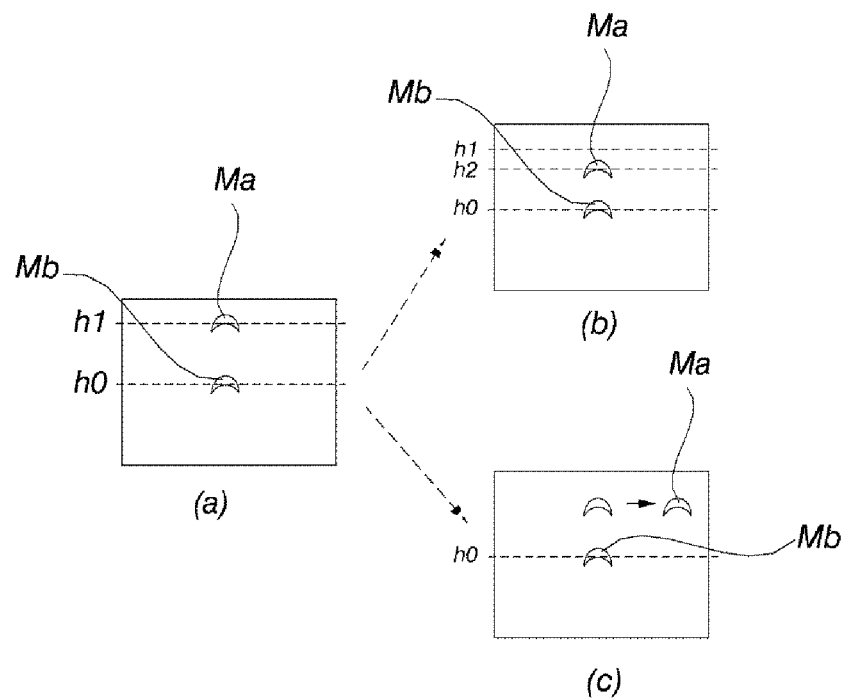
FIG. 9 is a view illustrating changes in positions of the markers illustrated in FIG. 8 on images, according to movement of the suction device.

FIG. 8 is a view illustrating an example of positions of markers. FIG. 9 is a view illustrating changes in positions of the markers illustrated in FIG. 8 on images, according to movement of the suction device. Referring to FIGS. 8 and 9, the cleaner may include a movement marker Ma disposed in the suction device 100 and a stationary marker Mb disposed in the main body 200 or at a fixed position relative to the main body 200. It is preferably that the stationary marker Mb is always arranged at a position within the visual field of the image acquisition unit 220 regardless of movement of the suction device 100 or deformation of the hose 300. Although the movement marker Ma is disposed in the upper pipe 132 of the intake pipe 130 and the stationary marker Mb is disposed in the main body connection section 320 of the hose 300 in the embodiment, the present invention is not necessarily limited thereto.

When the suction device 100 is away from the main body 200 in a state in which the stationary marker Mb and the movement marker Ma are located on the acquired image as illustrated in FIG. 9(a), a position H0 of the stationary marker Mb remains as it is on the acquired image and the movement marker Ma is moved downward (h2<h1) as illustrated in FIG. 9(b). Consequently, a distance between the movement marker Ma and the stationary marker Mb is decreased.

FIG. 9(c) illustrated a state in which the suction device 100 is moved to the right from a position shown in FIG. 9(a) in the real space. The marker information acquisition module 231 may acquire information on a distance change between the suction device 100 and the main body 200 and/or a movement direction of the suction device 100 relative to the main body 200 in the real space, based on the displacement of the movement marker Ma or the position relation change between the movement marker Ma and the stationary marker Mb on the above acquired image.

In particular, since the position of the movement marker Ma on the acquired image reflects a distance of the movement marker Ma relative to the main body 200 in the real space, the marker information acquisition module 231 may acquire position information of the movement marker Ma on the acquired image and estimate a distance from the main body 200 to the suction device 100 based on the position information.

Meanwhile, the suction device 100 is always placed on the floor during cleaning. At this time, however, the intake pipe 130 may be pivoted on the floor. As a result, the movement marker Ma may be moved upward and downward in the acquired image even when the suction device 100 is not actually moved. In this case, therefore, the distance from the main body 200 to the suction device 100 calculated by the marker information acquisition module 231 may be different from a real distance between the main body 200 and the suction device 100. In a normal situation, however, the user holds the handle 140 at the rear of the suction unit 120 in a state in which the suction port faces the floor of the cleaning zone. For this reason, the height from the floor to the movement marker Ma is almost uniform. Even if the height of the movement marker Ma is varied according to the pivot operation of the intake pipe 130, a displacement range of the movement t marker Ma is limited. Consequently, it is possible to control the active following operation of the main body 200 with sufficient accuracy.

The marker information acquisition module 231 may acquire information regarding the change in distance from the suction device 100 to the main body 200 in the real space based on the change in distance between the movement marker Ma and the stationary marker Mb in the acquired image. In a case in which the distance change information reflects that the suction device 100 becomes distant from the main body 200 (see FIG. 9(b)), the travel operation setting module 232 may set the travel operation of the main body 200 such that the main body 200 is moved forward to the suction device 100, and the travel control module 233 may control the travel unit 250 according to the set travel operation (forward movement) of the main body 200.

The marker information acquisition module 231 may acquire information regarding the change in direction of the suction device 100 in the real space based on the horizontal displacement of the movement marker Ma relative to the stationary marker Mb in the acquired image. In this case, the travel operation setting module 232 sets the travel direction of the main body 200 such that the main body 200 turns in the changed direction of the suction device 100, and the travel control module 233 controls the travel unit 250 according to the set travel operation (change in direction) of the main body 200.

Although the information on the position, movement, direction of the suction device 100 in the real space is acquired based on the changes in relative position or positions of the two markers Ma and Mb in the above embodiment described with reference to FIG. 9, the present invention is not necessarily limited thereto. The coordinate of each point on the acquired image reflects geometric characteristics at the point in the real space. Therefore, a variety of information on the movement marker Ma in the real space may be acquired based on the relative position or displacement of the movement marker Ma relative to the predetermined fixed point on the acquired image even though only one marker (for instance, the movement marker Ma) is present.

Figure 10:
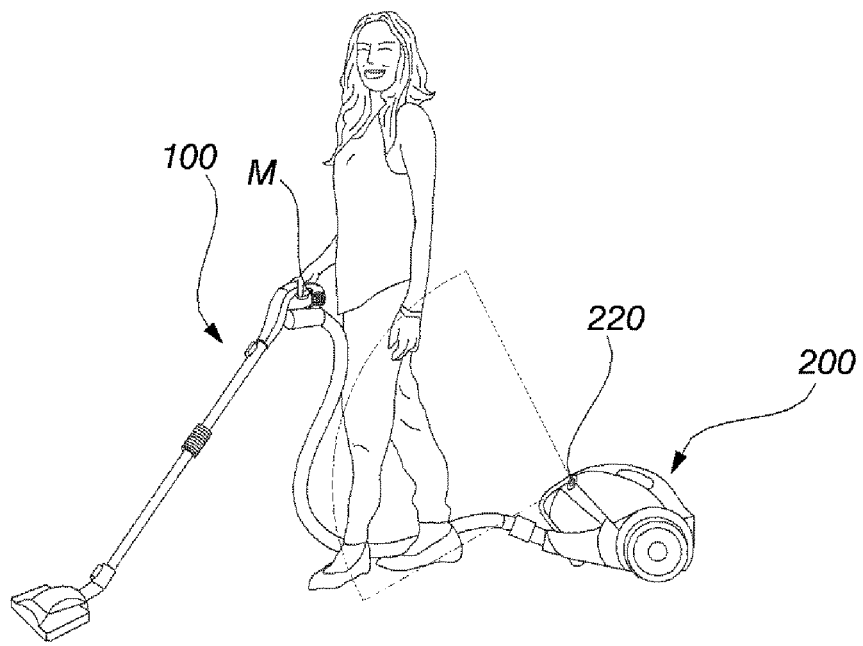
FIG. 10 is a view illustrating another example of a position of a marker.

FIG. 10 is a view illustrating another example of a position of a marker. Referring to FIG. 10, the marker M may be disposed at the suction device 100. Specifically, the marker M may be disposed at the upper end of the suction device 100. In this embodiment, the marker M is disposed at the handle 140. However, the present invention is not limited thereto. For example, the marker M may be disposed at a place exposed to the visual field of the image acquisition unit 220 as frequently as possible (i.e. a region rarely hidden by the user) in consideration of a general movement line of the user during cleaning. In this aspect, the handle 140 is suitable for a position at which the marker M is disposed since the hand of the user holding the handle 140 is exposed to the visual field of the image acquisition unit 220 as the hand of the user is naturally located beside the body of the user.

Figure 11:
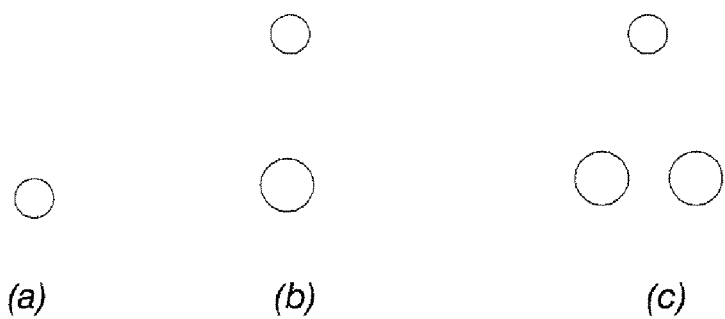
FIG. 11 is a view illustrating configuration examples of a marker.

FIG. 11 is a view illustrating configuration examples of a marker. Referring to FIG. 11, the marker M may have various identification patterns. Hereinafter, a factor, such as a point, a line, or a plane, constituting the patterns will be defined as a marker component. The marker may have an identity, by which the marker is obviously distinguished from a background. In addition, such an identity may not be affected by lighting around the marker. The marker may have a point, a line, a contour, an area, or a combination thereof as a marker component.

The marker M may be brighter than the background in consideration of an identity of the marker M distinguished from the background. In this aspect, the marker M may be classified as a reflective type marker which reflects light around the marker to have an identity of higher luminance than the background or a self emissive type marker which self-emits light.

The reflective type marker M may be formed by applying a highly reflective paint to a surface of an object. Alternatively, the reflective type marker M may be formed by attaching a highly reflective material to the surface of the object. The reflective type marker has an advantage in that a position to which the reflective type marker is attached is not limited. In a low illuminance environment, however, the reflective type marker M has a low identity. For this reason, a lighting device for illuminating the marker M may be further provided. The lighting device may be provided at the main body 200 for illuminating ahead of the main body 200.

The self emissive type marker M has a light source configured to electrically emit light. A light emitting diode (LED) or an infrared light source may be used as the light source. The self emissive type marker M has an advantage in that the self emissive type marker M can be identified even in a low illuminance environment.

FIG. 11 shows marker components, each of which is constituted by a point having a contour. FIG. 11(a) shows a case in which one marker component constitutes one marker, FIG. 11(b) shows a case in which two marker components constitute one marker, and FIG. 11(c) shows a case in which three marker components, which are arranged in the shape of a triangle, constitute one marker. In the following description, it is assumed that the marker components are points for convenience of description.

The change in position or shape of the marker indicated in the acquired image is complicated as a degree of freedom (dof) of the portion at which the marker is disposed is increased. Consequently, it is necessary to consider the degree of freedom of the portion at which the marker is disposed when designing patterns of the marker.

In this aspect, since the marker of FIG. 11(a) is constituted by one point, the movement of the marker that can be recognized through the acquired image is limited to translation of the marker based on coordinates of the point.

Since the marker of FIG. 11(b) is constituted by two points, it is possible to further recognize rotation of the marker based on the change in distance between the two points. For example, it is possible to recognize pitching and yawing as previously described with reference to FIG. 6.

Since the marker of FIG. 11(c) is constituted by three points, it is possible to further recognize rolling. In addition, it is also possible to recognize similarity based on the change in area of a triangle constituted by the three points, and therefore it is possible to estimate the change in area of the triangle according to zooming, etc.

Since it is possible to recognize higher degree of freedom movement of the marker or the portion at which the marker is disposed as the number of the marker components constituting the marker is increased, the marker may include an appropriate number of marker components based on movement of the marker to be recognized.

Figure 12:
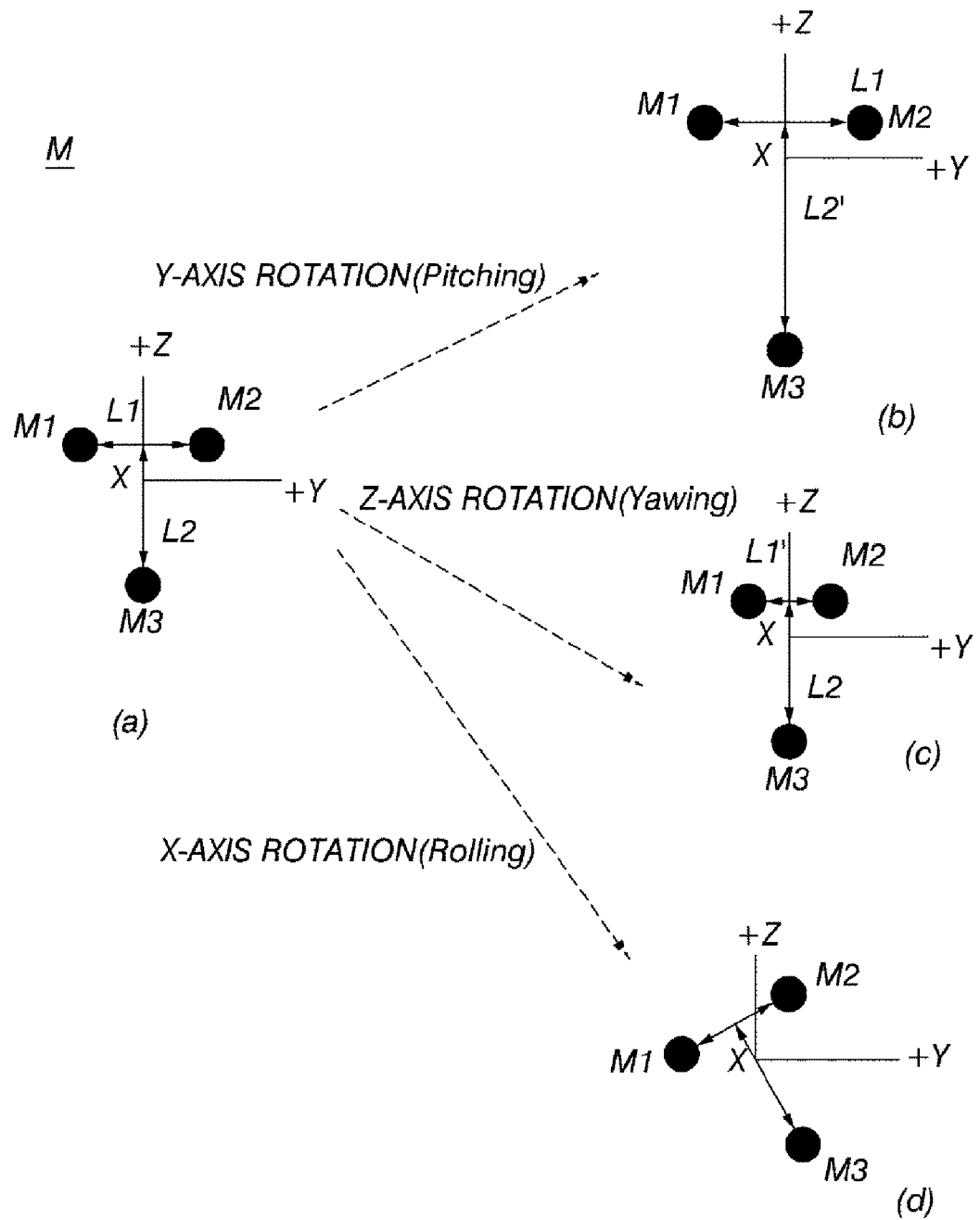
FIGS. 12 and 13 are views illustrating a change in shape of the marker in the acquired image based on the change in posture of the marker of FIG. 11(c)
Figure 13:
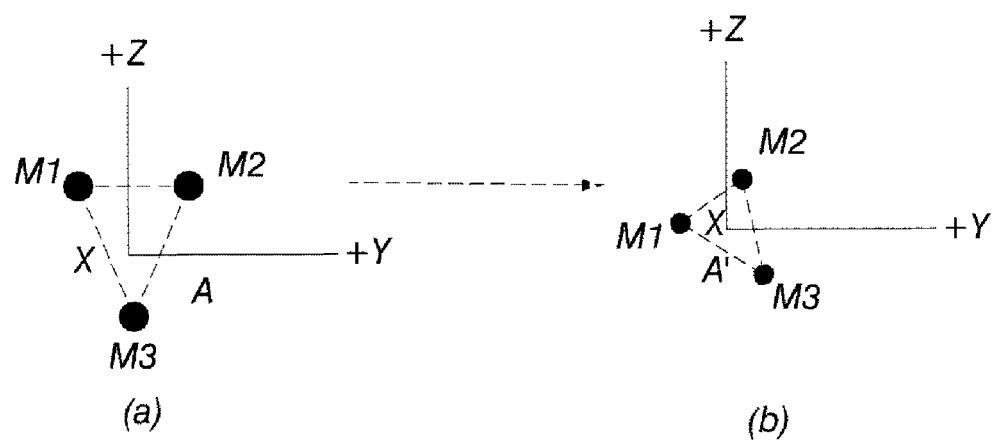

FIGS. 12 and 13 are views illustrating a change in shape of the marker in the acquired image based on the change in posture of the marker of FIG. 11(c). FIG. 12(a) shows that a marker including three marker components (for example, points) M1, M2, and M3 as shown in FIG. 11(c) is indicated in the acquired image. X, Y, and Z shown in FIG. 12(a) constitute a three-dimensional Cartesian coordinate system (based on a right hand). The acquired image corresponds to a YZ plane. In the following description, the marker M is disposed at the handle 140.

In case of which the marker M includes 2 marker components, the marker information acquisition module 231 may acquire rotation information of the marker for an axis orthogonal to an optical axis O of the image acquisition unit 220 in the real space based on a change in vertical distance between two marker components indicated in the acquired image. Especially, when the marker M includes tree marker component M1, M2 and M3, the marker information acquisition module 231 may acquire rotation information of the marker for an axis orthogonal to an optical axis O of the image acquisition unit 220 in the real space based on a change in distance from one (M3) of the three marker components indicated in the image to a segment formed by the other two (M1, M2) of the tree marker components.

FIG. 12(b) shows a phase of the marker M changed according to pitching (Y-axis rotation) of the handle 140 in the acquired image. It can be seen from FIG. 12(b) that the distance from a straight line interconnecting the marker components M1 and M2 to the marker component M3 has been changed from L2 to L2'. The marker information acquisition module 231 may acquire information regarding a Y-axis rotation angle of the handle 140 based on the change in distance between the line interconnecting the marker components M1 and M2 and the marker component M3.

FIG. 12(c) shows a phase of the marker M changed according to yawing (Z-axis rotation) of the handle 140 in the acquired image. It can be seen from FIG. 12(c) that the distance between the marker components M1 and M2 has been changed from L1 to L1'. The marker information acquisition module 231 may acquire information regarding a Z-axis rotation angle of the handle 140 based on the change in distance between the marker components M1 and M2.

FIG. 12(d) shows a phase of the marker M changed according to rolling (X-axis rotation) of the handle 140 in the acquired image. It can be seen from FIG. 12(d) that all of the marker components M1, M2, and M3 have been rotated in a state in which relative positions among the marker components M1, M2, and M3 are maintained. The marker information acquisition module 231 may acquire information regarding an X-axis rotation angle of the handle 140 based on the rotation angles of the marker components.

FIG. 13 shows similarity of a pattern recognized from the marker M including three marker components. FIG. 13(a) shows a triangle constituted by the three marker components in the acquired image, and FIG. 13(b) shows a state in which the marker M is rolled and thus changed as the marker M becomes distant from the main body 200. It can be seen from FIG. 13(b) that the area of a region, i.e. a triangle, defined by the three marker components in the acquired image has been reduced from A to A'.

It is possible to recognize a distance from the main body 200 to the handle 14 based on the position of the marker M and to recognize a direction in which the handle 140 is moved relative to the main body 200 based on the displacement of the marker M in addition to the various movements of the marker M including the three marker components as described above with reference to FIGS. 12 and 13.

Figure 14:
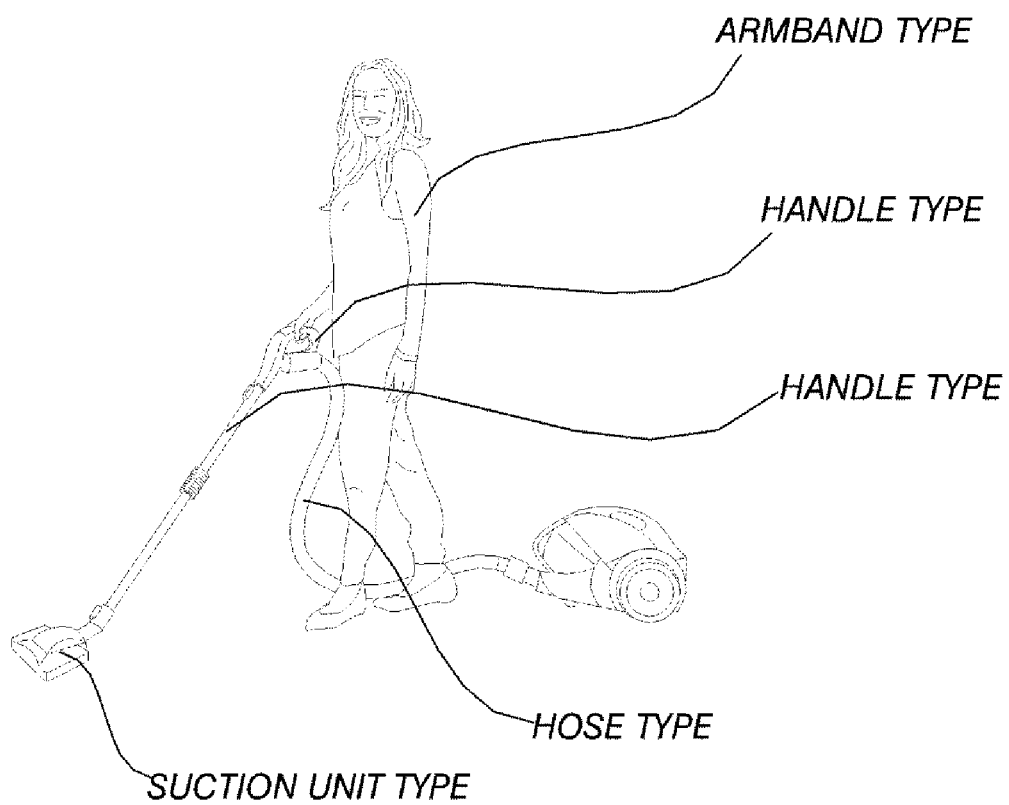
FIG. 14 is a view for explaining positions at which markers are disposed.

Referring to FIG. 14, the marker M may be disposed at the handle 140, the intake pipe 130, the suction unit 120, or the hose 300. (In the figure, the marker M is shown as a handle type marker, an intake pipe type marker, a suction unit type marker, or a hose type marker.) In addition, the marker M may be attached to a body of the user. For example, the marker M may be provided in the form of an armband (an armband type marker of FIG. 14).

Figure 15:
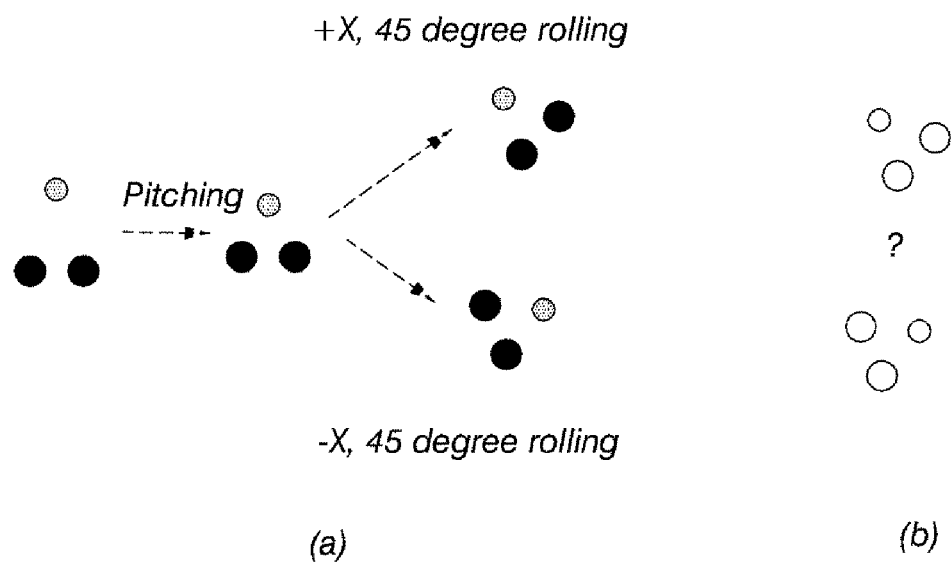
FIGS. 15 and 16 are views illustrating another configuration example of a marker.
Figure 16:
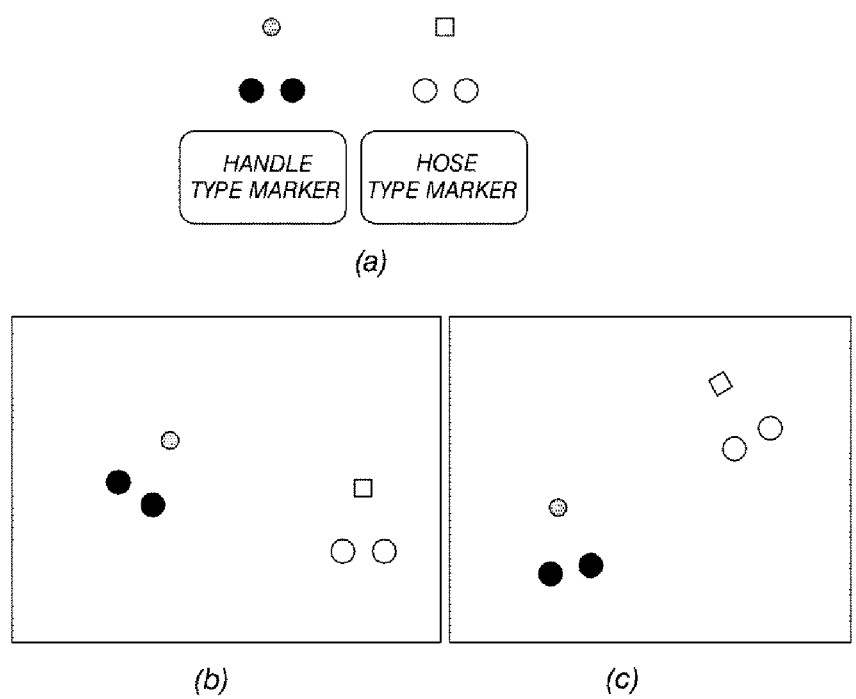

FIGS. 15 and 16 are views showing configurations of the marker according to other embodiments of the present invention. Referring to FIG. 15, the marker M may include marker components having different colors. In this case, it is possible for the marker information acquisition module 231 to more accurately acquire information regarding the change in phase of the marker M. The marker shown in FIG. 15(a) includes one grey marker component M1 and two black marker components M2 and M3. The marker is configured to have an isosceles triangular structure in which the distance between the grey marker component M1 and one of the black marker components M2 and M3 (the distance between M1 and M2 or the distance between M1 and M3) is different from that between the black marker components M2 and M3. A case in which the marker is rotated about a +X axis by 45 degrees (+X, 45 degree rolling) after the position of the grey marker component M1 is changed according to pitching of the marker with the result that the marker components M1, M2, and M3 are disposed at vertices of an equilateral triangle and a case in which the marker is rotated about a −X axis by 45 degrees (−X, 45 degree rolling) after the position of the grey marker component M1 is changed according to pitching of the marker with the result that the marker components M1, M2, and M3 are disposed at the vertices of the equilateral triangle are compared. As shown in the figure, in both a case in which the marker is rotated about the +X axis by 45 degrees and a case in which the marker is rotated about the −X axis by 45 degrees, the marker components are disposed to have an equilateral triangular structure. Since the marker component M1 has a color different from that of the marker component M2 or M3, however, it is possible to recognize a direction in which the marker is rotated in both the cases. On the other hand, in a case in which the marker components have the same color, as shown in FIG. 15(b), the shape of the marker after pitching of the marker is identical to or very similar to that of the marker after rolling of the marker with the result that it is difficult for the marker information acquisition module 231 to accurately recognize a direction in which the marker is rolled in both the cases. For this reason, different colors are given to the marker components so as to recognize even the change in posture of the marker, which is difficult to recognize through only the arrangement structure of the marker components.

The marker may include marker components having different shapes. Even in this case, a shape characteristic of the marker components is provided in addition to the arrangement structure of the marker components in the same manner as in the case in which the marker components have different colors. Consequently, it is possible to increase information that can be acquired by the marker information acquisition module 231.

A plurality of markers M may be provided. In this case, the markers M may have different features. These features may include a structural feature (for example, the arrangement structure of the marker components) as described above, a difference in shape between the markers or among the marker components, and a difference in color among the marker components. The marker information acquisition module 231 may estimate movement of the respective parts of the cleaner at which the markers are disposed based on information regarding the position of the markers, the movement of the markers, and the change in shape between the markers acquired through the acquired image. FIG. 16 shows such an example. Specifically, FIG. 16 shows images acquired in a case in which one of two markers, which are different from each other in terms of the shape and color of the marker components, is disposed at the handle 140, and the other marker is disposed at the hose 300 (see FIG. 16(a)). The handle 140 and the hose 300 are moved according to the movement of the suction device 100 during cleaning with the result that a positional relationship between the markers is changed from the positional relationship between the markers as shown in an acquired image (b) to the positional relationship between the markers as shown in another acquired image (c). In this case, the marker information acquisition module 231 may recognize the markers based on different features of the markers, and estimate movement aspects of the handle 140 and the hose 300 based on the position of the markers, the movement of the markers, and the change in shape between the markers in the acquired image.

In the embodiment described above, the movement of the suction device 100 is recognized based on the position, displacement, and/or posture change of the marker indicated in the acquired image. On the other hand, the marker information acquisition module 231 may be configured to detect the user from the acquired image. A predetermined template may be configured based on characteristics (for example, two feet extending from one trunk) of a human body, and the marker information acquisition module 231 may extract a shape corresponding to the predetermined template (for example, a shape constituted by the characteristics of the human body) from the acquired image to acquire position information of the user. In this case, the travel operation setting module 232 may set the travel operation of the main body 200 such that the main body 200 follows the user based on the position information of the user, and the travel control module 233 may control the travel unit 250 according to the set travel operation of the main body 200.

Figure 17:
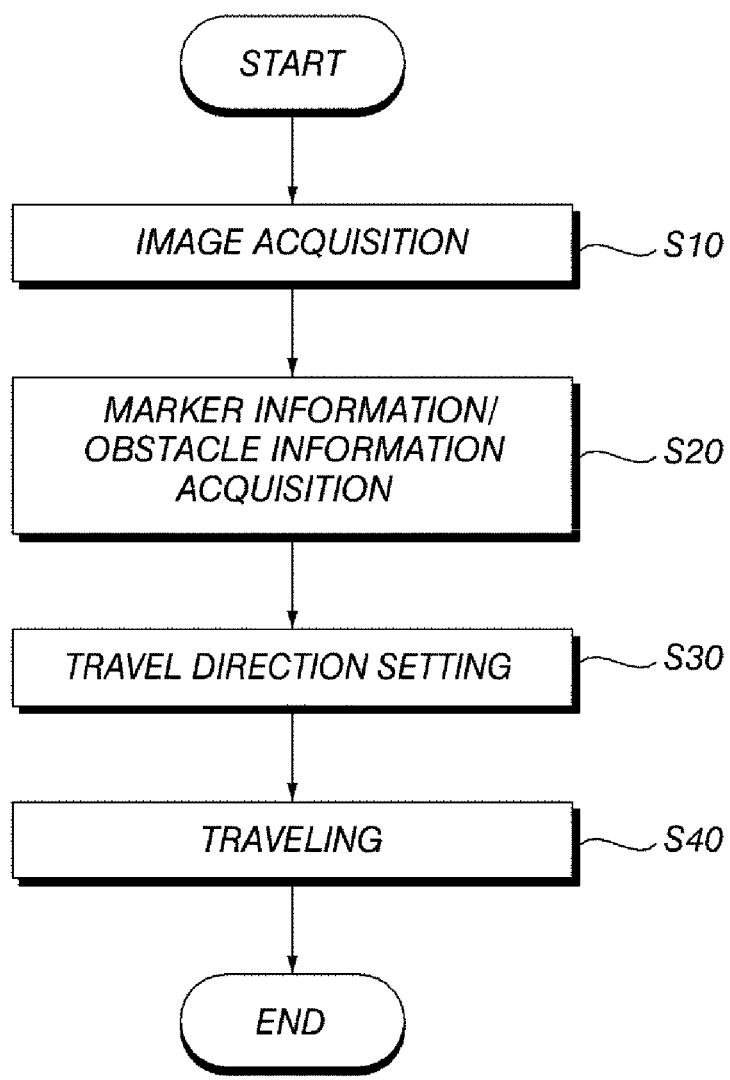
FIG. 17 is a flowchart illustrating a method of controlling a cleaner according to an embodiment of the present invention.
Figure 19:
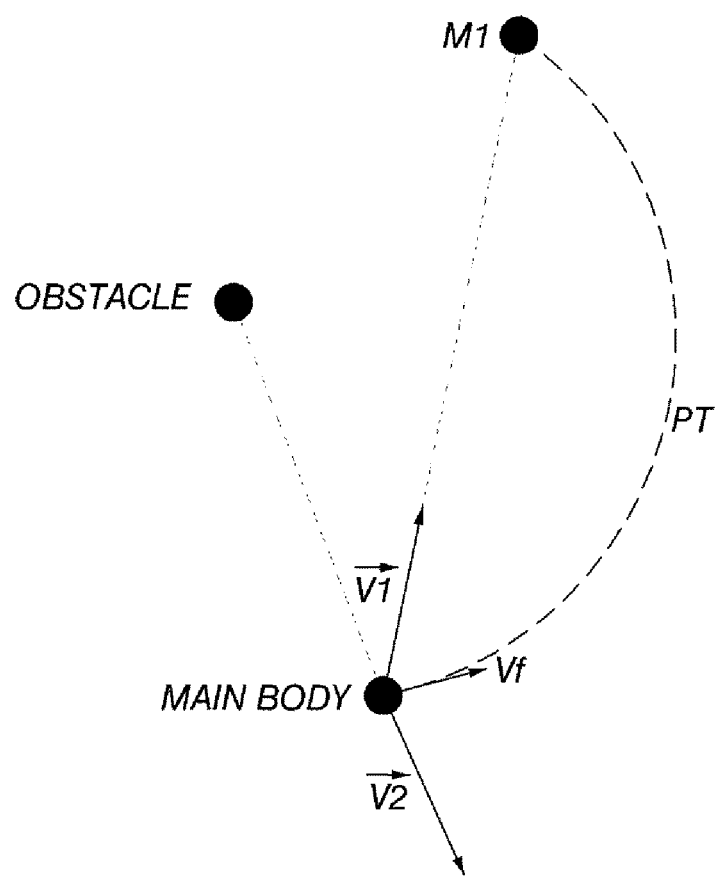
FIG. 19 is a view illustrating an example of a method of setting the travel direction of the main body in consideration of the elements explained with reference to FIG. 18.

FIG. 17 is a flowchart illustrating a method of controlling a cleaner according to an embodiment of the present invention. FIG. 18 is a view for explaining elements considered when a travel direction of a main body is set in step S30 of FIG. 17. FIG. 19 is a view illustrating an example of a method of setting the travel direction of the main body in consideration of the elements explained with reference to FIG. 18.

The method of controlling a cleaner according to the embodiment of the present invention includes a step of acquiring an image for a view (for instance, a front image or an image in a travel direction) around a main body 200, a step of acquiring position information of a suction device 100 in an real space, based on the image, a step of acquiring position information of an obstacle in the real space, based on the image, a step of setting a travel direction such that the main body 200 avoids the obstacle to follow the suction device 100, based on the position information of the suction device 10 and the position information of the obstacle, and a step in which the main body 200 travels in the set travel direction. Although an example in which the position information of the suction device 100 is determined based on a marker M disposed at the suction device 100 is described below in the embodiment, the present invention is not necessarily limited thereto. For example, the position information of the suction device 100 may also be determined based on characteristics (a silhouette, a color, and the like) of the suction device 100 identified through the acquired image.

In more detail, referring to FIG. 17, the method of controlling a cleaner according to the embodiment of the present invention may include an image acquisition step S10, a marker information and obstacle information acquisition step S20, a travel direction setting step S30, and a traveling step S40.

The image acquisition step S10 is a step of acquiring the image (for instance, the front image or the image in the travel direction) for a view around the main body 200 by an image acquisition unit 220. As illustrated in FIG. 3, a marker M and a pattern P deformed by an obstacle may be identified on the acquired image obtained by the image acquisition unit 220. As described above, the upper region UA on the acquired image may be used as a region in which the marker M is extracted and the lower region LA may be used as a region in which the pattern P deformed or displaced by the obstacle is extracted.

In more detail, a marker information acquisition module 231 may detect a marker M in the upper region UA and acquire marker information from the detected marker M. The marker information may include position information of the marker M (a distance from the main body 200 to the marker M, see FIG. 4), information on a direction in which the marker M is located relative to the main body 200 (see FIG. 9(*c*)), movement information of the marker M (see FIG. 4), posture change information of the marker M (see FIGS. 12 and 13), and the like.

In addition, an obstacle information acquisition module 236 may detect an acquired image, preferably a pattern P in the lower region LA, and acquire obstacle information based on the detected pattern P in step S20. The obstacle information may include information such as a position of the obstacle or a distance from the main body 200 to the obstacle in the real space, a direction in which the obstacle is located relative to the main body 200, a shape of the obstacle, and the number of obstacles. Particularly, the information on the distance from the main body 200 to the obstacle in the real space and/or on the direction in which the obstacle is located relative to the main body 200 is a important factor capable of being considered in setting of the travel direction such that the main body 200 avoids the obstacle to travel in step S20 described later.

The travel direction setting step S30 is a step of setting the travel direction such that the main body 200 avoids the obstacle while following the suction device 100 based on the marker information and the obstacle information obtained in step S20. A travel operation setting module 232 may set a travel direction (or a travel route) in which the main body 200 avoids the obstacle to follow the suction device 100 based on the marker information acquired by the marker information acquisition module 231 and the obstacle information acquired by the information acquisition module 236.

The traveling step S40 is a step in which the main body 200 travels in the travel direction set in step S30. A travel control module 233 may control a travel unit 250 such that the main body 200 is operated (for instance, changes its direction or travels) in the set travel direction.

Hereinafter, an example of the method of setting the travel direction (hereinafter, referred to as "avoidance following direction) in which the main body 200 avoids the obstacle to follow the suction device 100 in step S30 will be described with reference to FIGS. 18 and 19.

The avoidance following direction may be set based on a position vector V1 (hereinafter, referred to as "first vector) of a first marker M1 disposed in the suction device 100 relative to the main body 200 and a position vector V2 (hereinafter, referred to as "second vector) of the main body 200 relative to the obstacle. Although the first marker M1 is illustrated to be disposed at the handle 140 in the embodiment, the present invention is not limited thereto. For example, the first marker M1 may also be disposed at other portions constituting the suction device 100 (for instance, at an intake pipe 130). In addition, the first marker M1 may be realized in various marker forms described with reference to FIGS. 11 to 13. The position vector V1 of the first marker M1 relative to the main body 200 has a large influence on setting of the avoidance following direction as the distance from the main body 200 to the first marker M1 is increased. That is, the main body 200 travels toward the first marker M1 as the magnitude of the first vector V1 is further increased.

The first vector V1 may be calculated based on the position of the first marker M1 on the acquired image. As described above, the marker information acquisition module 231 may detect the first marker M1 in the upper region UA on the acquired image and calculate the position vector V1 of the first marker M1 relative to the main body 200 in the real space, based on the position at which the detected first marker M1 is located on the acquired image. In this case, the direction of the first vector V1 is directed toward the first marker M1 from the main body 200, and the magnitude thereof is proportional to a distance Rt from the main body 200 to the first marker M1.

The position vector V2 of the main body 200 relative to the obstacle may be calculated based on the position of the obstacle displayed on the acquired image. As described above, the obstacle information acquisition module 236 may detect the obstacle in the lower region LA on the acquired image and calculate the position vector V2 of the main body 200 relative to the obstacle in the real space, based on the position at which the detected obstacle is located on the acquired image. In this case, the direction of the second vector V2 is directed toward the main body 200 from the obstacle, and the magnitude thereof is proportional to a distance Ro from the main body 200 to the obstacle.

The travel operation setting module 232 may set an avoidance following direction based on the first and second vectors V1 and V2. When no obstacle is present on a path of a straight line connecting the main body 200 to the first marker M1, the main body 200 most preferably travels straight toward the first marker M1. However, when an obstacle is present on a travel route of the main body 200, the main body 200 should avoid the obstacle. Therefore, the travel direction of the main body 200 should be changed according to obstacle circumstances in the cleaning region. Here, whether the main body 200 changes its direction to an extent in order to avoid the obstacle is preferably set in consideration of the distance from the main body 200 to the obstacle. For example, when an obstacle is close to the main body 200, the main body 200 strikes the obstacle even though slightly traveling so that the direction change of the main body 200 has to be rapidly performed. Accordingly, in this case, the travel direction of the main body 200 has to be changed at a larger angle. On the other hand, even though the direction change of the main body 200 is slightly performed when an obstacle is away from the main body 200 by a significant distance, a possibility of the main body 200 striking the obstacle is gradually decreased when the main body 200 continues to travel in the changed direction. In this case, since the direction change of the main body 200 is relatively slightly performed, the main body 200 may not strike the obstacle. That is, the direction change of the main body 200 should be set in consideration of influence by obstacles (influence increases as obstacles are close to the main body 200), and the main body 200 should change its direction by a larger angle as the influence by obstacles increases.

The avoidance following direction Vf set according to the above description may be expressed by the following equation:

$$\vec{Vf} = \vec{V1} + \vec{V2} = k1\vec{v1} + k2\vec{v2}, \quad k1 \propto Rt, \quad k2 \propto \frac{1}{Ro}, \quad \text{[Equation 1]}$$

where each of $\vec{v1}, \vec{v2}$ is a unit vector having a magnitude of 1.

As seen by Equation 1, the avoidance following direction Vf may be determined by a linear combination of the first vector V1 and the second vector V2. Here, each of k1 and k2 is influence when the suction device 100 and the obstacle set the avoidance following direction Vf, k1 is proportional to the distance Rt from the main body 200 to the first marker M1, k2 is inversely proportional to the distance Ro from the main body 200 to the obstacle.

The travel operation setting module 232 may reset the avoidance following direction Vf while the main body 200 travels. Since the first and second vectors V1 and V2 are also changed when the main body 200 is displaced during traveling, the travel operation setting module 232 may accurately control the traveling of the main body 200 by repeatedly resetting the avoidance following direction Vf even when the main body 200 travels. A travel route PT illustrated in FIG. 19 refers to a movement trajectory of the main body 200 obtained by repeated resetting of the avoidance following direction Vf when the main body 200 travels.

Meanwhile, an instant travel direction ingredient V3 is a travel direction ingredient of the main body 200 which is varied according to the direction of tension acting on the main body 200 from the hose 300. According to the above-mentioned definition in which the movement of the main body 200 is classified into the active movement and the passive movement, the instant travel direction ingredient V3 is a direction ingredient generated due to the effect of the passive movement, from among direction ingredients for determining the travel direction of the main body 200.

The cleaner may further include a sensing means (not shown) for sensing the instant travel direction ingredient V3. The sensing means may be a sensor for sensing an extension direction of the hose 300 in the real space. The sensor, for example, may include a strain gauge for sensing the magnitude and direction of tension acting from the hose 300, a gyroscope for sensing a posture change according to deformation of the hose 300, and the like.

In addition, the instant travel direction ingredient V3 may be sensed through the posture change of the hose 300 displayed on the acquired image. When the hose 300 is assumed to be connected to the front portion of the main body 200, the image acquisition unit 220 acquires an image capturing a portion of the hose 300 adjacent to the main body 200. When it is assumed that the suction device 100 moves straight and the main body 200 move straight toward the suction device 100 so that the hose 300 naturally hangs down between the suction device 100 and the main body 200, geometry characteristics such as a position, a posture, and a shape of the hose 300 displayed on the acquired image in this case substantially exhibit a constant aspect. However, deformation of the hose 300 is observed in the real space and on the acquired image as the travel direction of the suction device 100 is changed. Accordingly, the controller 230 may sense the instant travel direction ingredient V3, based on the deformation of the hose 300 observed through the acquired image.

A second marker M2 may be disposed at the hose 300. In addition, the second marker M2 may be realized in various marker forms described with reference to FIGS. 11 to 13. The marker information acquisition module 231 may determine an instant travel direction ingredient V3, based on the position of the second marker M2 displayed on the acquired image (hereinafter, a vector V3 being referred to as "third vector"). The second marker M2 is preferably disposed at a portion adjacent to the main body 200 such that a direction of tension acting on the main body 200 from the hose 300 may be significantly accurately estimated. The direction of the third vector V3 is a direction of tension acting on the main body 200 from the hose 300, and the magnitude thereof is proportional to influence of the hose 300 on movement of the main body 200. Here, the influence of the hose 300 may be determined in consideration of flexibility, length, and the like of the hose 300. For example, when the suction device 100 is moved, the hose may have a large value of influence as the tension acting on the main body 200 from the hose 300 increases. Unlike this, the influence of the hose 300 may be inversely proportional to flexibility of the hose 300.

Figure 20:
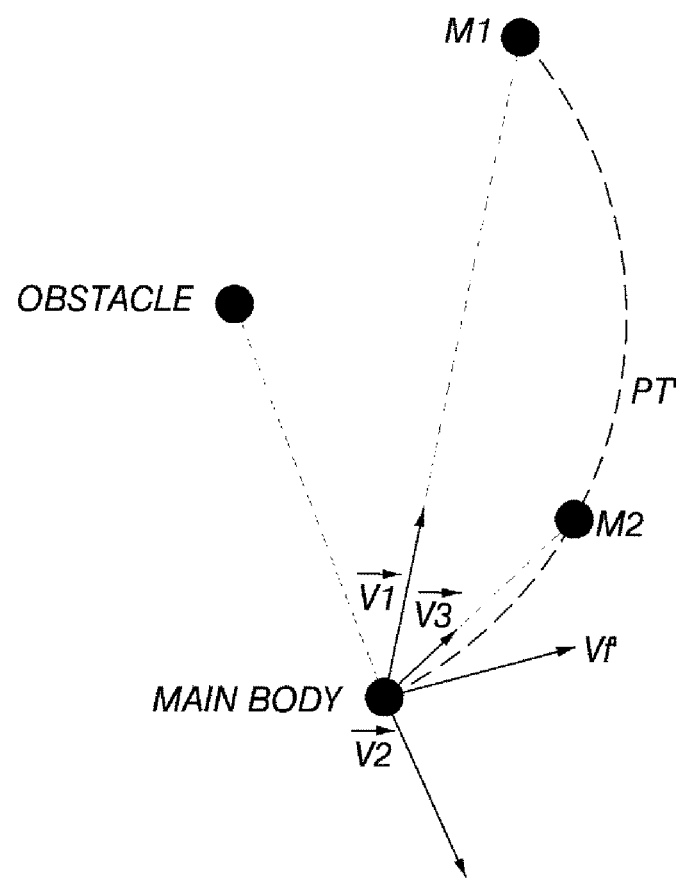
FIG. 20 is a view illustrating another example of the method of setting the travel direction of the main body in consideration of the elements explained with reference to FIG. 18.

FIG. 20 is a view illustrating another example of the method of setting the travel direction of the main body in consideration of the elements explained with reference to FIG. 18. Referring to FIG. 20, an avoidance following direction Vf' may be set based on the first vector V1, the second vector V2, and the third vector V3. The avoidance following direction Vf according to the embodiment may be expressed by the following equation:

$$\vec{Vf'} = \vec{V1} + \vec{V2} + \vec{V3} = k1\vec{v1} + k2\vec{v2} + k3\vec{v3} \qquad \text{[Equation 2]}$$

$$k1 \propto Rt, \quad k2 \propto \frac{1}{Ro},$$

where k3 is influence of the hose 300 and each of $\vec{v1}$, $\vec{v2}$, $\vec{v3}$ is a unit vector having a magnitude of 1.

As seen by Equation 2, the avoidance following direction Vf' may be determined by a linear combination of the first vector V1, the second vector V2, and the third vector V3. Particularly, in the embodiment, the third vector V3 is further considered to set the avoidance following direction Vf', compared to Equation 1.

A travel route PT' illustrated in FIG. 20 refers to a movement trajectory of the main body 200 obtained by repeated resetting of the avoidance following direction Vf' when the main body 200 travels.

Figure 21:
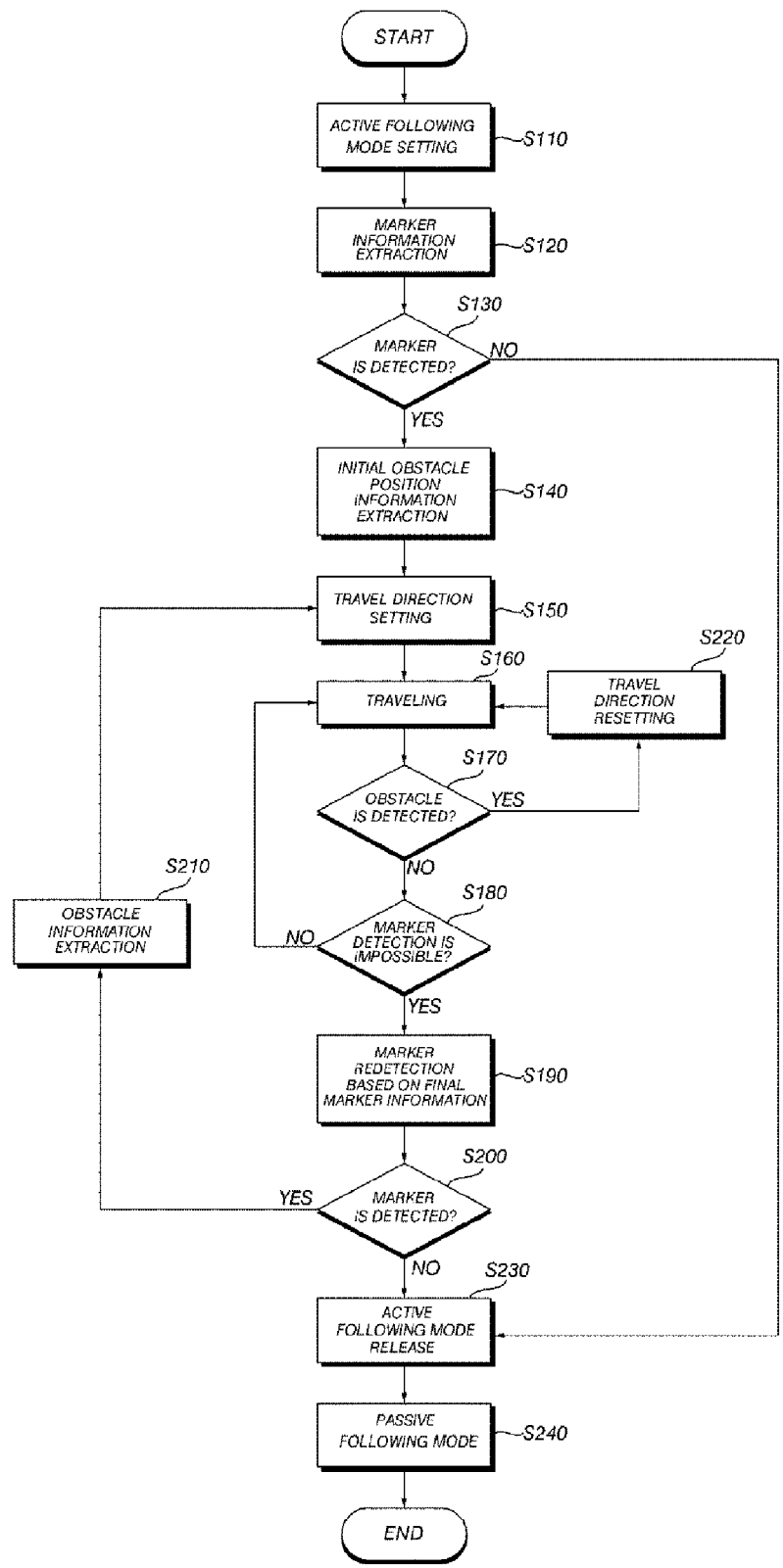
FIG. 21 is a flowchart illustrating a method of controlling a cleaner according to another embodiment of the present invention.

FIG. 21 is a flowchart illustrating a method of controlling a cleaner according to another embodiment of the present invention. Referring to FIG. 21, the cleaner may selectively set an active following mode and a passive following mode. A main body 200 actively follows a suction device 100 when the active following mode is set, and passively follows the suction device 100 when the passive following mode is set. The active following mode or the passive following mode may be set and/or released through the manipulation unit 110 by a user, but the present invention is not limited thereto. For example, the active following mode or the passive following mode may be automatically performed based on marker information or obstacle information obtained through an acquired image.

A clutch may be operated such that driving force is transferred from a motor to wheels 212 and 213 in a state in which the active following mode is set. A marker information extraction step S120 is performed in the state in which the active following mode is set (S110). A controller 230 acquires position information of a marker M1 based on the acquired image. The marker M1 is detected on the acquired image by a marker information acquisition module 231, and the position information of the marker M1 may be acquired in an real space, based on the same. The detected position information of the marker M1 may be stored in a recording medium (not shown) such as RAM.

In particular, the above first vector V1 described with reference to FIG. 18 may be calculated in the marker information extraction step S120. Furthermore, position information of a marker M2 disposed at a hose 300 may be further acquired in the marker information extraction step S120.

When the marker is detected in the marker information extraction step S120 ("YES" in step S130), an initial obstacle position information extraction step S140 of extracting position information of an obstacle based on the acquired image may be performed by the controller 230. The obstacle is detected on the acquired image by an obstacle information acquisition module 236, and the position information of the obstacle may be acquired in the real space, based on the same. Particularly, the above second vector V2 described with reference to FIG. 18 may be calculated in the obstacle information extraction step S140.

When the detection of the marker M1 fails in the marker information extraction step S120 ("NO" in step S130), the active following mode is released (S230) and may be changed to the passive following mode (S240).

In a travel direction setting step S150, an avoidance following direction in which the main body 200 avoids the obstacle to follow the suction device 100 may be set based on the position information of the marker extracted in the marker information extraction step S120 and the position information of the obstacle extracted in the initial obstacle position information extraction step S140. In the embodiment, a travel operation setting module 232 may set the avoidance following direction Vf or Vf' according to Equation 1 or 2.

A traveling step S160 is a step of controlling the traveling of the main body 200, based on the avoidance following direction Vf or Vf' set in the travel direction setting step S150. A travel control module 233 controls a travel unit 250 such that the main body 200 is operated (changes its direction and/or travels) in the avoidance following direction Vf or Vf'.

The obstacle may be redetected through the acquired image when the main body 200 travels based on the set avoidance following direction Vf or Vf' (an obstacle redetection step S170). When the obstacle is detected in the obstacle redetection step S170 ("YES" in step S170), an obstacle information acquisition module 236 recalculates a position vector V2' of the main body 200 relative to the obstacle, and reset the avoidance following direction based on the same (S220). In Equation 1 or 2, the second vector V2 is converted into a newly calculated vector V2'. Of course, the obstacle detected in step S140 and a new obstacle may also be additionally detected in the obstacle redetection step S170. In addition, a position vector V1' of a first marker M1 relative to the main body 200 and/or a position vector V3' of a second marker M2 relative to the main body 200 may be recalculated in step S170. In this case, in Equation 1 or 2, the first and third vectors V1 and V3 are converted into newly calculated vectors V1' and V3'. In the embodiment, the avoidance following direction may be reset based on the vectors V1' and V2' (see Equation 1) or the vectors V1', V2', and V3'.

The main body 200 is operated based on the reset avoidance following direction (S220→S160), and a step S170 is repeated again when the main body 200 travels (S160→S170). The position information of the markers M1 and M2 may be repeatedly detected and stored during the travel of the main body 200. A series of steps S170, S220, and S160 are preferably performed when the marker M1 is detected on the acquired image while the main body 200 travels. When the marker M1 is not detected on the acquired image ("YES" in step S180), the marker M1 may be redetected based on the position information of the marker M1 finally stored in the recording medium (a marker redetection step S190).

In the marker redetection step S190, the travel control module 233 may change the direction of the main body 200 such that a point in the real space corresponding to the recorded position information is displayed on the acquired image, based on the position information of the marker M1 finally stored in the recording medium. The marker information acquisition module 231 attempts to redetect the marker M1 on the acquired image in the state in which the direction of the main body 200 is changed.

When the marker M1 is detected again through the acquired image in the marker redetection step S190 ("YES" in step S200, the obstacle is detected and the position information of the obstacle (for instance, V2) is acquired again by the obstacle information acquisition module 236 (S210), the avoidance following direction is reset based on the position information of the marker M1 (for instance, V1) and the obstacle information (for instance, V2) acquired in step S200 (S150), and thus the main body 200 travels (S160). In the embodiment, the position information of the marker M2 (for instance, V3) disposed at the hose 300 may be further acquired in step S200. In this case, the resetting of the avoidance following direction (S150) performed after step S200 is performed according to Equation 2, and the vectors V1, V2, and V3 in Equation 2 are converted into those calculated in step S200 or step S210.

Meanwhile, when the detection of the marker M1 fails through the acquired image in step S190 ("NO" in step S200), the active following mode is released (S230) and the passive following mode may be set (S240). The clutch may be operated such that the transfer of driving force from the motor to the wheels 212 and 213 is released in step S240.

Meanwhile, considering that the main body 200 travels on a two-dimensional plane, the first, second, and/or third vector(s) V1, V2, and/or V3 is(are) enough to be a vector(s) on the two-dimensional plane. However, since the marker information acquisition module 231 and the obstacle information acquisition module 236 also acquire three-dimensional position information of the marker M1 or M2 or obstacle, the first, second, and/or third vector(s) V1, V2, and/or V3 calculated based on the three-dimensional position information may also be a vector(s) in a three-dimension space. In this case, the avoidance following direction may be determined based on a coordinate of the marker M1 or M2 or obstacle on the plane (for instance, on the X-Y plane in FIG. 13) on which the main body 200 travels, from among ingredients of the three-dimensional orthogonal coordinate (X-, Y-, and Z-axes in FIGS. 12 and 13) constituting the respective vectors.

In accordance with the cleaner and the method of controlling the same, the following body (or main body) may follow the movable body (or suction device) while avoiding an obstacle even though the obstacle is present in the cleaning region.

In addition, since the position of the movable body and the obstacle circumstances are directly recognized based on the image capturing the front of the following body, accuracy of the following body may be significantly improved compared to an indirect following method of using ultrasonic waves.

In addition, the following body may follow the movable body while avoiding the obstacle and an optimal direction (or path) in which the following body moves may be set by considering the positions of the movable body and obstacle together.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a cleaner comprising a movable body for suctioning and a following body for collecting dust particles suctioned by the movable body, the movable body being connected to the following body by hose which guides the dust particles suctioned by the movable body to the following body, the method comprising:
   acquiring, by an image acquisition unit, an image of a view around the following body;
   acquiring, by a controller, position information of the movable body in a real space based on the image;
   acquiring, by the controller, position information of an obstacle in the real space based on the image;
   setting, by the controller, a travel direction such that the following body avoids the obstacle to follow the movable body based on the movable body position information and the obstacle position information; and
   controlling the following body to travel in the set travel direction,
   wherein the travel direction is determined based on a linear combination of a first vector in a direction toward the movable body from the following body, which is obtained based on the movable body position information, a second vector in a direction toward the following body from the obstacle, which is obtained based on the obstacle position information, and a third vector in a direction in which the tension acts on the following body from the hose.

2. The method according to claim 1, wherein the first vector has a magnitude that is proportional to a distance from the following body to the movable body, which is obtained based on the movable body position information.

3. The method according to claim 1, wherein the second vector has a magnitude that is inversely proportional to a distance from the following body to the obstacle, which is obtained based on the obstacle position information.

4. The method according to claim 1, wherein:
   the movable body includes a marker, and
   the movable body position information is determined based on a position of the marker displayed on the image.

5. The method according to claim 4, wherein:
   the movable body position information is acquired in an upper region on the image where the position of the marker moves downward on the image as the position of the marker becomes more distant from the following body in real space.

6. The method according to claim 5, wherein the obstacle position information is acquired in a lower region on the image, whereby the lower region is located below the upper region on the image.

7. The method according to claim 1, further comprising:
radiating, by a pattern light irradiation unit, light having a predetermined pattern toward a front of the following body while the light is radiated downward so as to form a predetermined angle with a horizontal plane,
wherein the obstacle position information is determined based on a position of the pattern displayed on the image.

8. The method according to claim 1, further comprising:
repeatedly setting the travel direction while the following body travels such that the following body avoids the obstacle to follow the movable body based on the movable body position information and the obstacle position information.

9. The method according to claim 1, wherein:
the movable body includes a marker;
determining the movable body position information based on a position of the marker displayed on the image;
repeatedly acquiring, while the following body is traveling, the movable body position information in the real space based on the image; and
when the movable body position information is not acquired while the following body is traveling, changing a direction of the following body such that the marker is displayed on the image based on a previously acquired movable body position information.

10. The method according to claim 1, further comprising setting an active following mode for the cleaner, such that while the cleaner is operating in the active following mode,
the image of the view around the following body is acquired,
based on the image, the movable body position information and the obstacle position information in the real space is acquired;
the travel direction is set such that the following body avoids the obstacle to follow the movable body based on the movable body position information and the obstacle position information; and
the following body is controlled to travel in the set travel direction.

11. A method of controlling a cleaner comprising a movable body for suctioning and a following body for collecting dust particles suctioned by the movable body, the movable body being connected to the following body by a hose which guides the dust particles suctioned by the movable body to the following body, the method comprising:
acquiring, by an image acquisition unit, an image of a view around the following body;
acquiring, by a controller, position information of the movable body in a real space based on the image;
acquiring, by the controller, position information of an obstacle in the real space based on the image;
setting, by the controller, a travel direction such that the following body avoids the obstacle to follow the movable body based on the movable body position information and the obstacle position information;
controlling the following body to travel in the set travel direction;
obtaining, by a sensor, a direction of tension acting on the following body from the hose; and
determining the travel direction based on a linear combination of the first vector, the second vector, and a third vector in a direction in which the tension acts.

12. The method according to claim 11, wherein:
the hose includes a marker, and
the third vector is obtained based on a position of the marker displayed on the image.

13. The method according to claim 12, wherein the third vector has a magnitude that is inversely proportional to a flexibility of the hose.

14. A method of controlling a cleaner comprising a movable body for suctioning and a following body for collecting dust particles suctioned by the movable body, the movable body being connected to the following body by a hose, the method comprising:
acquiring, by an image acquisition unit, an image of a view around the following body;
acquiring, by a controller, position information of the movable body in a real space based on the image;
acquiring, by the controller, position information of an obstacle in the real space based on the image;
setting, by the controller, a travel direction such that the following body avoids the obstacle to follow the movable body based on the movable body position information and the obstacle position information;
controlling the following body to travel in the set travel direction;
setting an active following mode for the cleaner, such that while the cleaner is operating in the active following mode,
the image of the view around the following body is acquired,
based on the image, the movable body position information and the obstacle position information in the real space is acquired;
the travel direction is set such that the following body avoids the obstacle to follow the movable body based on the movable body position information and the obstacle position information;
the following body is controlled to travel in the set travel direction; and
releasing the setting of the active following mode when the movable body position information in the real space based on the image is not acquired,
wherein the dust particles suctioned by the movable body are guided through the hose to the following body.

15. A cleaner comprising:
a movable body to suction particles;
a following body to follow the movable body and collect the particles suctioned by the movable body, the movable body being connected to the following body by a hose which guides the dust particles suctioned by the movable body to the following body;
a travel unit to allow the following body to travel;
an image acquisition unit to acquire an image of a view around the following body;
a controller to acquire position information of the movable body in a real space, wherein, based on the image, the controller acquires position information of an obstacle in the real space, sets a travel direction such that the following body avoids the obstacle to follow the movable body based on the movable body position information and the obstacle position information, and controls the travel unit such that the following body travels in the set travel direction;
a marker disposed in the movable body, wherein
the controller comprises a marker information acquisition module to acquire the movable body position information based on a position of the marker displayed on the image acquired by the image acquisition unit, wherein:
the movable body position information is obtained based on the position of the marker displayed in an upper region on the image acquired by the image acquisition unit, where the position of the marker is moved downward on the image as the position of the marker becomes more distant from the following body in the real space, wherein the controller further comprises an obstacle information acquisition module to acquire the obstacle position information in a lower region on the image, whereby the lower region is located below the upper region on the image, the marker information acquisition module to obtain a first vector in a direction toward the movable body from the following body, based on the movable body position information, the obstacle information acquisition module to obtain a second vector in a direction toward the following body from the obstacle, based on the obstacle position information, and the controller further comprises a travel operation setting module to determine the travel direction, based on a linear combination of the first vector and the second vector.

* * * * *